United States Patent
DeVoe et al.

(10) Patent No.: US 8,004,767 B2
(45) Date of Patent: *Aug. 23, 2011

(54) PROCESS FOR MAKING MICROLENS ARRAYS AND MASTERFORMS

(75) Inventors: Robert J. DeVoe, Oakdale, MN (US); Dora M. Paolucci, St. Paul, MN (US); Craig R. Sykora, New Richmond, WI (US); Todd A. Ballen, St. Paul, MN (US); Douglas S. Dunn, Maplewood, MN (US); Jeffrey M. Florczak, Woodbury, MN (US); Catherine A. Leatherdale, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/509,904

(22) Filed: Jul. 27, 2009

(65) Prior Publication Data

US 2009/0284840 A1 Nov. 19, 2009

Related U.S. Application Data

(62) Division of application No. 11/313,482, filed on Dec. 21, 2005, now Pat. No. 7,583,444.

(51) Int. Cl.
*G02B 27/10* (2006.01)

(52) U.S. Cl. ........ 359/619; 359/621; 359/622; 359/626; 359/628; 359/708; 355/67

(58) Field of Classification Search ................. 359/618, 359/619, 621, 622, 626, 628, 634, 637, 708, 359/710; 385/24, 33, 37; 372/9; 348/335; 355/67; 430/325

See application file for complete search history.

(56) References Cited

U.S. PATENT DOCUMENTS

| | | |
|---|---|---|
| 3,018,262 A | 1/1962 | Schroeder |
| 3,729,313 A | 4/1973 | Smith |
| 3,741,769 A | 6/1973 | Smith |
| 3,779,778 A | 12/1973 | Smith et al. |
| 3,784,378 A | 1/1974 | Gramas |

(Continued)

FOREIGN PATENT DOCUMENTS

EP 0 426 0441 12/1996

(Continued)

OTHER PUBLICATIONS

U.S. Appl. No. 12/158,143, filed Dec. 20, 2006, Sykora, et al., "Method And Apparatus For Processing Multiphoton Curable Photoreactive Compositions" (related to WO2007/073482).

(Continued)

*Primary Examiner* — Loha Ben

(57) ABSTRACT

A process for making a microlens array or a microlens array masterform comprises
(a) providing a photoreactive composition, the photoreactive composition comprising
(1) at least one reactive species that is capable of undergoing an acid- or radical-initiated chemical reaction, and
(2) at least one multiphoton photoinitiator system; and
(b) imagewise exposing at least a portion of the composition to light sufficient to cause simultaneous absorption of at least two photons, thereby inducing at least one acid- or radical-initiated chemical reaction where the composition is exposed to the light, the imagewise exposing being carried out in a pattern that is effective to define at least the surface of a plurality of microlenses, each of the microlenses having a principal axis and a focal length, and at least one of the microlenses being an aspherical microlens.

11 Claims, 2 Drawing Sheets

U.S. PATENT DOCUMENTS

| | | |
|---|---|---|
| 3,808,006 A | 4/1974 | Smith |
| 4,250,053 A | 2/1981 | Smith |
| 4,279,717 A | 7/1981 | Eckberg et al. |
| 4,394,403 A | 7/1983 | Smith |
| 4,491,628 A | 1/1985 | Ito et al. |
| 4,642,126 A | 2/1987 | Zador et al. |
| 4,652,274 A | 3/1987 | Boettcher et al. |
| 4,859,572 A | 8/1989 | Farid et al. |
| 5,018,164 A | 5/1991 | Brewer et al. |
| 5,235,015 A | 8/1993 | Ali et al. |
| 5,254,390 A | 10/1993 | Lu |
| 5,300,263 A | 4/1994 | Hoopman et al. |
| 5,439,621 A | 8/1995 | Hoopman |
| 5,519,539 A | 5/1996 | Hoopman et al. |
| 5,545,676 A | 8/1996 | Palazzotto et al. |
| 5,593,221 A | 1/1997 | Evanicky et al. |
| 5,604,635 A | 2/1997 | Lawandy |
| 5,707,684 A | 1/1998 | Hayes et al. |
| 5,730,518 A | 3/1998 | Kashima et al. |
| 5,753,346 A | 5/1998 | Leir et al. |
| 5,770,737 A | 6/1998 | Reinhardt et al. |
| 5,856,373 A | 1/1999 | Kaisaki et al. |
| 5,859,251 A | 1/1999 | Reinhardt et al. |
| 5,896,119 A | 4/1999 | Evanicky et al. |
| 5,986,811 A | 11/1999 | Wohlstadter |
| 5,998,495 A | 12/1999 | Oxman et al. |
| 6,025,406 A | 2/2000 | Oxman et al. |
| 6,039,553 A | 3/2000 | Lundin et al. |
| 6,100,405 A | 8/2000 | Reinhardt et al. |
| 6,122,109 A | 9/2000 | Peake et al. |
| 6,157,017 A | 12/2000 | Kim |
| 6,167,182 A | 12/2000 | Shinohara et al. |
| 6,174,064 B1 | 1/2001 | Kalantar et al. |
| 6,300,502 B1 | 10/2001 | Kannan et al. |
| 6,339,503 B1 | 1/2002 | Derstine et al. |
| 6,339,506 B1 | 1/2002 | Wakelin et al. |
| 6,347,874 B1 | 2/2002 | Boyd et al. |
| 6,379,016 B1 | 4/2002 | Boyd et al. |
| 6,425,673 B1 | 7/2002 | Suga et al. |
| 6,548,144 B1 | 4/2003 | Teshima et al. |
| 6,576,887 B2 | 6/2003 | Whitney et al. |
| 6,683,725 B2 | 1/2004 | Wohlstadter |
| 6,816,306 B2 * | 11/2004 | Freese et al. ............... 359/456 |
| 6,822,190 B2 | 11/2004 | Smithson et al. |
| 6,822,799 B2 | 11/2004 | Kitamura et al. |
| 6,835,535 B2 | 12/2004 | Gretton et al. |
| 6,852,766 B1 | 2/2005 | DeVoe |
| 6,853,490 B2 * | 2/2005 | Wang et al. ............... 359/621 |
| 6,855,478 B2 | 2/2005 | DeVoe et al. |
| 7,005,229 B2 | 2/2006 | Nirmal et al. |
| 7,009,774 B2 * | 3/2006 | Yoshikawa et al. .......... 359/626 |
| 7,014,988 B2 | 3/2006 | DeVoe et al. |
| 7,026,103 B2 | 4/2006 | DeVoe et al. |
| 7,031,065 B2 * | 4/2006 | Uchikawa et al. .......... 359/626 |
| 7,033,736 B2 | 4/2006 | Morris et al. |
| 7,060,419 B2 | 6/2006 | Bentsen et al. |
| 7,091,255 B2 | 8/2006 | DeVoe |
| 7,092,166 B1 * | 8/2006 | Wood ........................... 359/626 |
| 7,166,409 B2 | 1/2007 | Fleming et al. |
| 7,209,624 B2 * | 4/2007 | Reynolds et al. ............ 385/133 |
| 7,232,650 B2 | 6/2007 | Leatherdale et al. |
| 7,265,161 B2 | 9/2007 | Leatherdale et al. |
| 7,372,631 B2 * | 5/2008 | Ozawa ......................... 359/619 |
| 7,381,516 B2 | 6/2008 | Arney et al. |
| 7,583,444 B1 * | 9/2009 | DeVoe et al. ................ 359/626 |
| 2002/0006648 A1 | 1/2002 | Goodman et al. |
| 2002/0045285 A1 | 4/2002 | Ushijima et al. |
| 2002/0145797 A1 | 10/2002 | Sales |
| 2003/0016930 A1 | 1/2003 | Inditsky |
| 2003/0155667 A1 | 8/2003 | Devoe et al. |
| 2004/0012872 A1 | 1/2004 | Fleming et al. |
| 2004/0067451 A1 | 4/2004 | DeVoe et al. |
| 2004/0126694 A1 | 7/2004 | Devoe et al. |
| 2004/0179348 A1 | 9/2004 | Pesenti |
| 2004/0223385 A1 | 11/2004 | Fleming et al. |
| 2005/0063064 A1 | 3/2005 | Becker et al. |
| 2005/0124712 A1 | 6/2005 | Anderson et al. |
| 2005/0147918 A1 | 7/2005 | Weber et al. |
| 2006/0048498 A1 | 3/2006 | Takasaka et al. |
| 2006/0078831 A1 | 4/2006 | DeVoe et al. |
| 2006/0115214 A1 | 6/2006 | Cassarly |
| 2007/0035843 A1 | 2/2007 | Cassarly |
| 2007/0058391 A1 | 3/2007 | Wilson et al. |
| 2007/0087284 A1 | 4/2007 | Fleming et al. |
| 2007/0207410 A1 | 9/2007 | Leatherdale et al. |
| 2007/0264501 A1 | 11/2007 | Leatherdale et al. |
| 2007/0282030 A1 | 12/2007 | Anderson et al. |

FOREIGN PATENT DOCUMENTS

| | | |
|---|---|---|
| FR | 2859543 | 3/2005 |
| JP | 03-198003 | 8/1991 |
| JP | 11-237625 | 8/1999 |
| KR | 10-2004-0090640 | 10/2004 |
| WO | WO 95/06889 | 3/1995 |
| WO | WO 98/21521 | 5/1998 |
| WO | WO 99/53242 | 10/1999 |
| WO | WO 01/96452 A2 | 12/2001 |
| WO | WO 01/96962 A2 | 12/2001 |
| WO | WO 2004/070438 A1 | 8/2004 |
| WO | WO 2007/073482 | 6/2007 |
| WO | WO 2007/137102 | 11/2007 |

OTHER PUBLICATIONS

U.S. Appl. No. 12/299,955, filed May 17, 2007, Marttila, et al., "Process for Making Light Guides with Extraction Structures and Light Guides Produced Thereby" (related to WO2007/137102).

R. D. Allen, G. M. Wallraff, W. D. Hinsberg, and L. L. Simpson in "High Performance Acrylic Polymers for Chemically Amplified Photoresist Applications," J. Vac. Sci. Technol. B, 9, 3357 (1991).

R. D Allen et al. In Proc. SPIE 2438, 474 (1995).

Beringer et al., *J. Am. Chem. Soc.* 81, 342 (1959).

Beuret, C., G.-A. Racine, J. Gobet, R. Luthier, and N.F. de Rooij. "Microfabrication of 3D Multidirectional Inclined Structures by UV Lithography and Electroplating", Proc. IEEE Micro Electro Mechanical Syst. MEMS (1994), Oiso, Japan, pp. 81-85.

R. J. Cox, *Photographic Sensitivity*, Chapter 15, Academic Press (1973).

D. F. Eaton in *Advances in Photochemistry*, edited by B. Voman et al., vol. 13, pp. 427-488, John Wiley and Sons, New York (1986).

C. K. Mann and K. K. Barnes, *Electrochemical Reactions in Nonaqueous Systems* (1970).

Morgan, B., C. Waits, J. Krizmanic, and R. Ghodssi, "Development of a Deep Silicon Phase Fresnel Lens Using Gray-Scale Lithography and Deep Reactive Ion Etching", Journal of Microelectromechanical Systems, vol. 13, No. 1, Feb. 2004, pp. 112-120.

*Omron Electronic Components Web*, Product Principles, http://www.omron.co.jp/ecb/products/bklight/english/genri/index.html, Apr. 3, 2007, pp. 1-2.

Totsu, K., K. Fujishiro, S. Tanaka, and M. Esashi, "Gray-Scale Lithography using Mask-Less Exposure System", The 13th International Conference on Solid-State Sensors, Actutators and Microsystems, Seoul, Korea, Jun. 5-9, 2005.

Waits, C., R. Ghodssi, M. Ervin, and M. Dubey, "MEMS-based Gray-Scale Lithography", Semiconductor Device Research Symposium, 2001 International, (2001), pp. 182-185.

N. L. Weinburg, Ed., Technique of Electroorganic Synthesis Part II Techniques of Chemistry, vol. V (1975).

C. Xu and W. W. Webb in J. Opt. Soc. Am. B, 13, 481 (1996).

W. Zhou et al. in Science 296, 1106 (2002).

*Handbook of Epoxy Resins*, Lee and Neville, McGraw-Hill Book Co., New York (1967).

Chen et al., "Microjet Printing of High Precision Microlens Array for Packaging of Fiber-Optic Components", *Optoelectronic Interconnects, Integrated Circuits, and Packaging*, vol. 4652, Jun. 2002, pp. 136-141.

Croutxé-Barghorn et al., "Fabrication of Microlenses by Direct Photo-Induced Crosslinking Polymerization", *Applied Surface Science*, 2000, pp. 89-91.

Croutxé-Barghorn et al. "Fabrication of Refractive Microlens Arrays by Visible Irradiation of Acrylic Monomers: Influence of Photonic Parameters", *The European Physical Journal—Applied Physics*, vol. 13, No. 1, Jan. 2001, pp. 31-37.

Daly et al., "Little Lenses, Major Markets", *Photonics Spectra*, vol. 35, Issue 7, Jul. 2001, pp. 120-122.

Hutley, M.C., "Optical Techniques for the Generation of Microlens Arrays", *Journal of Modern Optics*, vol. 37, No. 2, Feb. 1990, pp. 253-265.

Lens (Optics), *McGraw-Hill Encyclopedia of Science and Technology*, 6$^{th}$ Edition, 1987.

Ming et al., "Fabrication of Holographic Microlenses Using a Deep Lithographed Zone Plate", *Applied Optics*, vol. 29, No. 34, Dec. 1990, pp. 5111-5114.

Moon et al., "Fabrication of a Microlens Array Using Micro-Compression Molding With an Electroformed Mold Insert", *Journal of Microengineering*, Dec. 2002.

Morey, Jennifer L., "Microlens Arrays Sharpen the Details", *Photonics Spectra*, vol. 31, Issue 12, Dec. 1997, pp. 110-114.

Oder, T.N. et al., "Nitride Microlens Arrays for Blue and Ultraviolet Wavelength Applications", *Applied Physics Letters*, vol. 82, No. 21, May 2003.

Oikawa, M. et al., "High Numerical Aperture Planar Microlens with Swelled Structure", *Applied Optics*, vol. 29, No. 28, Oct. 1990.

Steenblik, Richard A., and Hurt, Mark J., "Unison™ Micro-optic Security Film", *Proceedings of SPIE*, vol. 5310, Jun. 2004.

Whitaker et al., "Microfabrication of Graded Index Lenses Using Two Photon Induced Polymerization", *Lasers and Electro-Optics*, Jun. 2003, pp. 973-975.

Lee et al., "A novel refractive silicon microlens array using bulk micromachining technology", Sensors and Actuators, A, 88 (2001), pp. 87-90.

Henke, W., et al., "Simulation and experimental study of gray-tone lithography for the fabrication of arbitrarily shaped surfaces", Proc. IEEE Micro Electro Mechanical Syst. MEMS 994, OISO, Japan, pp. 205-210 (1994).

Chronis et al., "Tunable liquid-filled microlens array integrated with microfluidic network", *Optics Express*, vol. 11, No. 19, pp. 2370-2378 (2003).

Huang et al., "Applications of multidirectional asymmetrical microlens-array light-control films on reflective liquid-crystal displays for image quality enhancement", *Applied Optics*, vol. 43, No. 18, pp. 3656-3663 (2004).

\* cited by examiner

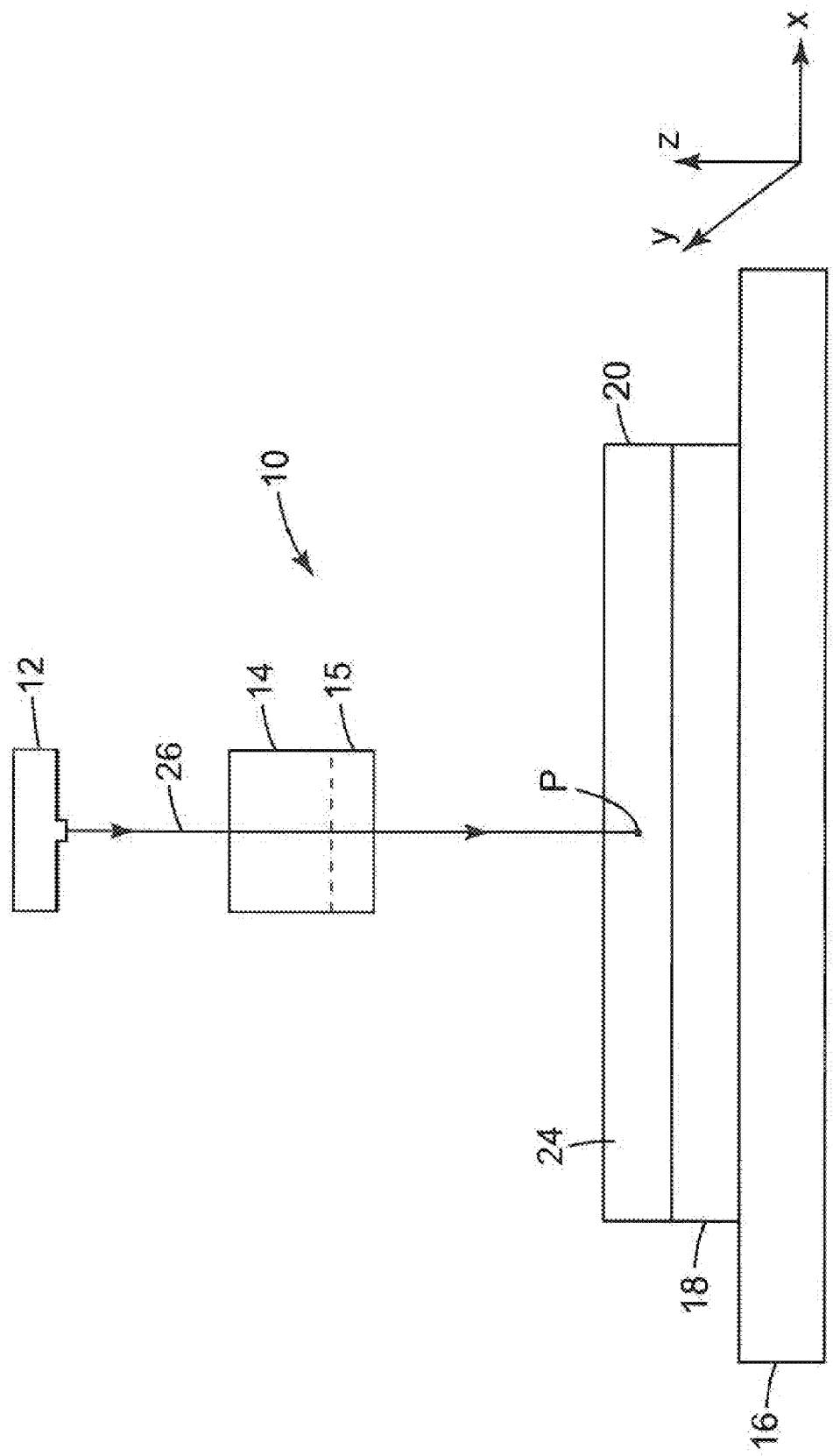

PROCESS FOR MAKING MICROLENS ARRAYS AND MASTERFORMS

CROSS REFERENCE TO RELATED APPLICATION

This application is a divisional of U.S. Ser. No. 11/313,482 filed Dec. 21, 2005 now U.S. Pat. No. 7,583,444, now allowed, the disclosure of which is incorporated by reference herein in its entirety.

FIELD

This invention relates to processes for making microlenses, microlens arrays, and/or microlens array masterforms and, in other aspects, to microlenses, microlens arrays, and/or microlens array masterforms made thereby.

BACKGROUND

Passive optical components (for example, lenses, prisms, and mirrors) are well-known and are used in optical systems to collect, distribute, or modify optical radiation. A desire for smaller and smaller optical devices has led to the development of technologies for fabricating miniature optical components, and refractive microlenses with diameters of two millimeters down to a few microns can now be fabricated with high quality.

Such microlenses, as well as microlens arrays, have been made by a number of different techniques, each having a different set of strengths and weaknesses. Techniques that have been used for the preparation of spherical lens arrays include photopolymer reflow, gray scale lithography, laser ablation, dip coating of curable monomers on patterned hydrophobic/hydrophilic substrates, ink jet printing of curable monomers, diamond turning, ion beam or wet etching, and electrodeposition.

Optical requirements can vary greatly from one application to another, however, and, for some applications, spherical aberrations can come into play. The use of aspherical microlenses can reduce such spherical aberrations. Thus, aspherical microlenses can be a desirable alternative to spherical microlenses in some cases.

The techniques that can be used to fabricate high numerical aperture, aspheric microlens arrays are considerably fewer in number, however, than those that can be used to produce spherical microlens arrays. Such techniques include primarily gray scale lithography, which, although widely used for the fabrication of microlens arrays, is generally somewhat limiting as to the microlens height or depth of field that can be achieved.

SUMMARY

Thus, we recognize that there is a need for processes that can be used to fabricate microlens arrays that can meet the quality, cost, and/or performance requirements of a variety of different applications. In particular, we recognize a need for processes that are capable of producing aspherical microlenses (preferably of high numerical aperture) and arrays comprising such microlenses (preferably of high fill factor).

Briefly, in one aspect, this invention provides a process for making a microlens array or a microlens array masterform. The process comprises (a) providing a photoreactive composition, the photoreactive composition comprising (1) at least one reactive species that is capable of undergoing an acid- or radical-initiated chemical reaction, and (2) at least one multiphoton photoinitiator system;

(b) imagewise exposing at least a portion of the composition to light sufficient to cause simultaneous absorption of at least two photons, thereby inducing at least one acid- or radical-initiated chemical reaction where the composition is exposed to the light, the imagewise exposing being carried out in a pattern that is effective to define at least the surface of a plurality of microlenses, each of the microlenses having a principal axis and a focal length, and at least one of the microlenses being an aspherical microlens;

(c) optionally, developing the composition by removing the resulting exposed portion, or the resulting non-exposed portion, of the composition; and (d) optionally, after imagewise exposing at least a portion of the composition, nonimagewise exposing at least a portion of the composition to light sufficient to effect reaction of at least a portion of any remaining unreacted photoreactive composition.

Preferably, the principal axis and/or the focal length of at least one microlens is different from that of at least one other microlens. Principal axes are different when they are not parallel (but rather are intersecting or are skew). Preferably, the reactive species is a curable species (more preferably, a curable species selected from the group consisting of monomers, oligomers, and reactive polymers).

It has been discovered that multiphoton photofabrication processes can be well-suited for fabricating microlens arrays comprising one or more aspherical microlenses, as well as arrays comprising microlenses having varying optical properties (for example, arrays exhibiting a spatial variation of principal axis and/or focal length). Surprisingly, the process of the invention can provide flexibility and control in producing a variety of individual microlens profiles in a single array, yet can be used to achieve desirably low levels of average surface roughness while maintaining industrially acceptable fabrication speeds or "throughput." Such flexibility and control can also facilitate the production of high fill factor arrays.

The process of the invention involves the use of relatively low-cost materials (for example, polymers) and is capable of relatively easy integration into the fabrication processes used in the manufacture of optoelectronic devices. The process also enables cost-effective replication (for example, through the production of masterforms). Furthermore, the process is capable of flexibly and controllably producing microlenses of various different shapes and heights (that is, different profiles) and microlens arrays of various different symmetries and fill factors, each such type of microlens and microlens array thereby having different, controlled optical properties.

Thus, at least some embodiments of the process of the invention meet the above-stated need for microlens array fabrication processes that can satisfy the quality, cost, and/or performance requirements of a variety of different applications and also, in particular, produce aspherical microlenses (preferably of high numerical aperture). Microlens arrays made by the process of the invention can be suitable for use in numerous optical applications including, for example, in displays and in photodetectors (for example, for charge-coupled device (CCD) imaging).

In another aspect, this invention also provides a plurality of microlenses, at least one of the microlenses being aspherical, and each of the microlenses having a principal axis, the principal axis of at least one microlens being different from that of at least one other microlens.

BRIEF DESCRIPTION OF DRAWING

These and other features, aspects, and advantages of the present invention will become better understood with regard to the following description, appended claims, and accompanying drawing, wherein:

FIG. 1 is a schematic representation of an exemplary multiphoton photofabrication system useful for carrying out the process of the invention.

DETAILED DESCRIPTION

Definitions

Figure 2A:
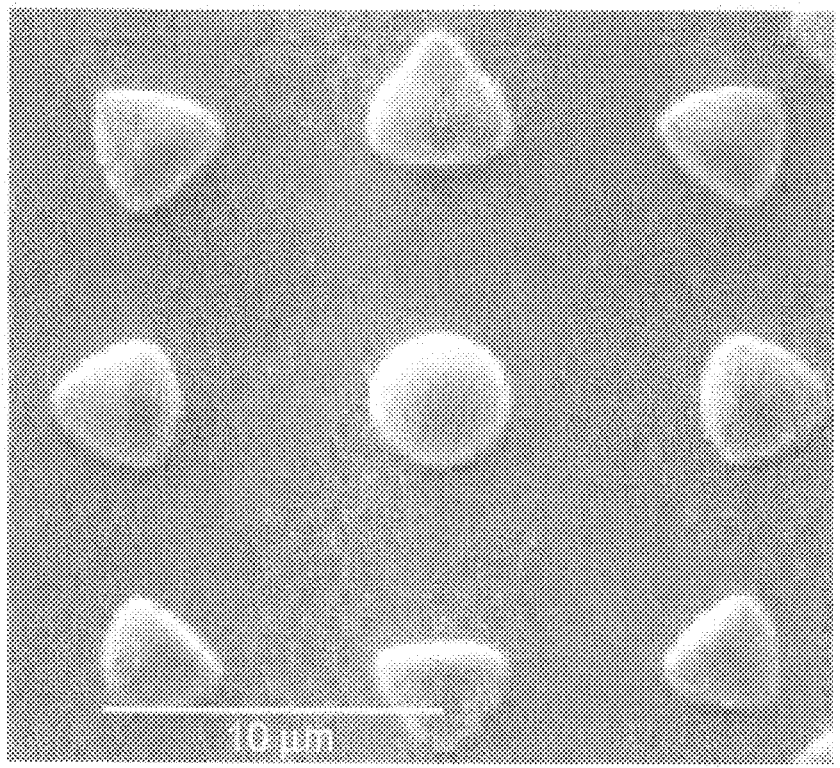
FIGS. 2a and 2b are scanning electron micrographs (a top view and a side view, respectively) of an embodiment of the microlens array of the invention, which embodiment was produced by the process of the invention and is described in Example 5 below.

As used in this patent application:

"anamorphic" (in regard to a lens) means an aspherical lens that has a different radius of curvature in each of two directions that are mutually orthogonal to the principal axis of the lens;

"aspherical" means other than spherical or cylindrical;

"average surface roughness" means the average deviation between the actual surface profile of a microlens and its average surface profile;

"cure" means to effect polymerization and/or to effect crosslinking;

"electronic excited state" means an electronic state of a molecule that is higher in energy than the molecule's electronic ground state, that is accessible via absorption of electromagnetic radiation, and that has a lifetime greater than $10^{-13}$ seconds;

"exposure system" means an optical system plus a light source;

"fill factor" (in regard to a lens array) means the portion or percentage of the area of the array that modifies incident actinic radiation;

"f number" means the ratio of the focal length of a lens to its diameter;

"masterform" means an originally-fabricated article that can be used to manufacture a tool for replication;

"microlens" means a lens having a diameter of less than about two millimeters;

"multiphoton absorption" means simultaneous absorption of two or more photons to reach a reactive, electronic excited state that is energetically inaccessible by the absorption of a single photon of the same energy;

"numerical aperture" means the ratio of the diameter of a lens to its focal length (or 1/f number);

"optical system" means a system for controlling light, the system including at least one element chosen from refractive optical elements such as lenses, reflective optical elements such as mirrors, and diffractive optical elements such as gratings. Optical elements shall also include diffusers, waveguides, and other elements known in the optical arts;

"photochemically effective amounts" (of the components of the photoinitiator system) means amounts sufficient to enable the reactive species to undergo at least partial reaction under the selected exposure conditions (as evidenced, for example, by a change in density, viscosity, color, pH, refractive index, or other physical or chemical property);

"photosensitizer" means a molecule that lowers the energy required to activate a photoinitiator by absorbing light of lower energy than is required by the photoinitiator for activation and interacting with the photoinitiator to produce a photoinitiating species therefrom;

"principal axis" means the line connecting the apex of a lens with the center of its base; principal axes are different when they are not parallel (but rather are intersecting or are skew);

"sag" means the height of a lens (and the two terms are used interchangeably herein); and "simultaneous" means two events that occur within the period of $10^{14}$ seconds or less;

"skew" (in regard to lines or principal axes) means other than intersecting or parallel;

"sufficient light" means light of sufficient intensity and appropriate wavelength to effect multiphoton absorption; and "three-dimensional light pattern" means an optical image wherein the light energy distribution resides in a volume or in multiple planes and not in a single plane.

Reactive Species

Reactive species suitable for use in the photoreactive compositions include both curable and non-curable species. Curable species are generally preferred and include, for example, addition-polymerizable monomers and oligomers and addition-crosslinkable polymers (such as free-radically polymerizable or crosslinkable ethylenically-unsaturated species including, for example, acrylates, methacrylates, and certain vinyl compounds such as styrenes), as well as cationically-polymerizable monomers and oligomers and cationically-crosslinkable polymers (which species are most commonly acid-initiated and which include, for example, epoxies, vinyl ethers, cyanate esters, etc.), and the like, and mixtures thereof.

Suitable ethylenically-unsaturated species are described, for example, by Palazzotto et al. in U.S. Pat. No. 5,545,676 at column 1, line 65, through column 2, line 26, and include mono-, di-, and poly-acrylates and methacrylates (for example, methyl acrylate, methyl methacrylate, ethyl acrylate, isopropyl methacrylate, n-hexyl acrylate, stearyl acrylate, allyl acrylate, glycerol diacrylate, glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyldimethyl-methane, trishydroxyethyl-isocyanurate trimethacrylate, the bis-acrylates and bis-methacrylates of polyethylene glycols of molecular weight about 200-500, copolymerizable mixtures of acrylated monomers such as those of U.S. Pat. No. 4,652,274, and acrylated oligomers such as those of U.S. Pat. No. 4,642,126); unsaturated amides (for example, methylene bis-acrylamide, methylene bis-methacrylamide, 1,6-hexamethylene bis-acrylamide, diethylene triamine tris-acrylamide and beta-methacrylaminoethyl methacrylate); vinyl compounds (for example, styrene, diallyl phthalate, divinyl succinate, divinyl adipate, and divinyl phthalate); and the like; and mixtures thereof. Suitable reactive polymers include polymers with pendant (meth)acrylate groups, for example, having from 1 to about 50 (meth)acrylate groups per polymer chain. Examples of such polymers include aromatic acid (meth)acrylate half ester resins such as Sarbox™ resins available from Sartomer (for example, Sarbox™ 400, 401, 402, 404, and 405). Other useful reactive polymers curable by free radical chemistry include those polymers that have a hydrocarbyl backbone and pendant peptide groups with free-radically polymerizable functionality attached thereto, such as those described in U.S. Pat. No. 5,235,015 (Ali et al.). Mixtures of two or more monomers, oligomers, and/or reactive polymers can be used if desired. Preferred ethylenically-unsaturated species include acrylates, aromatic acid (meth) acrylate half ester resins, and polymers that have a hydrocarbyl backbone and pendant peptide groups with free-radically polymerizable functionality attached thereto.

Suitable cationically-reactive species are described, for example, by Oxman et al. in U.S. Pat. Nos. 5,998,495 and 6,025,406 and include epoxy resins. Such materials, broadly called epoxides, include monomeric epoxy compounds and epoxides of the polymeric type and can be aliphatic, alicyclic, aromatic, or heterocyclic. These materials generally have, on the average, at least 1 polymerizable epoxy group per molecule (preferably, at least about 1.5 and, more preferably, at least about 2). The polymeric epoxides include linear polymers having terminal epoxy groups (for example, a diglycidyl ether of a polyoxyalkylene glycol), polymers having skeletal oxirane units (for example, polybutadiene polyepoxide), and polymers having pendant epoxy groups (for example, a glycidyl methacrylate polymer or copolymer). The epoxides can be pure compounds or can be mixtures of compounds containing one, two, or more epoxy groups per molecule. These epoxy-containing materials can vary greatly in the nature of their backbone and substituent groups. For example, the backbone can be of any type and substituent groups thereon can be any group that does not substantially interfere with cationic cure at room temperature. Illustrative of permissible substituent groups include halogens, ester groups, ethers, sulfonate groups, siloxane groups, nitro groups, phosphate groups, and the like. The molecular weight of the epoxy-containing materials can vary from about 58 to about 100,000 or more.

Other epoxy-containing materials that are useful include glycidyl ether monomers of the formula

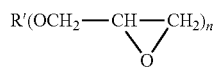

where R' is alkyl or aryl and n is an integer of 1 to 8. Examples are glycidyl ethers of polyhydric phenols obtained by reacting a polyhydric phenol with an excess of a chlorohydrin such as epichlorohydrin (for example, the diglycidyl ether of 2,2-bis-(2,3-epoxypropoxyphenol)-propane). Additional examples of epoxides of this type are described in U.S. Pat. No. 3,018,262, and in *Handbook of Epoxy Resins*, Lee and Neville, McGraw-Hill Book Co., New York (1967).

A number of commercially available epoxy monomers or resins can be used. Epoxides that are readily available include, but are not limited to, octadecylene oxide; epichlorohydrin; styrene oxide; vinylcyclohexene oxide; glycidol; glycidyl methacrylate; diglycidyl ethers of bisphenol A (for example, those available under the trade designations "EPON 815C", "EPON 813", "EPON 828", "EPON 1004F", and "EPON 1001F" from Hexion Specialty Chemicals, Inc., Columbus, Ohio); and diglycidyl ether of bisphenol F (for example, those available under the trade designations "ARALDITE GY281" from Ciba Specialty Chemicals Holding Company, Basel, Switzerland, and "EPON 862" from Hexion Specialty Chemicals, Inc.). Other aromatic epoxy resins include the SU-8 resins available from MicroChem Corp., Newton, Mass.

Other exemplary epoxy monomers include vinyl cyclohexene dioxide (available from SPI Supplies, West Chester, Pa.); 4-vinyl-1-cylcohexene diepoxide (available from Aldrich Chemical Co., Milwaukee, Wis.); 3,4-epoxycyclohexylmethyl-3,4-epoxycyclohexene carboxylate (for example, one available under the trade designation "CYRACURE UVR-6110" from Dow Chemical Co., Midland, Mich.); 3,4-epoxy-6-methylcylcohexylmethyl-3,4-epoxy-6-methylcylcohexane carboxylate; 2-(3,4-epoxycyclohexyl-5,5-spiro-3,4-epoxy) cyclohexane-metadioxane; bis(3,4-epoxycyclohexylmethyl) adipate (for example, one available under the trade designation "CYRACURE UVR-6128" from Dow Chemical Co.); bis(3,4-epoxy-6-methylclycohexylmethyl)adipate; 3,4-epoxy-6-methylcyclohexane carboxylate; and dipentene dioxide.

Still other exemplary epoxy resins include epoxidized polybutadiene (for example, one available under the trade designation "POLY BD 605E" from Sartomer Co., Inc., Exton, Pa.); epoxy silanes (for example, 3,4-epoxycylclohexylethyltrimethoxysilane and 3-glycidoxypropyltrimethoxysilane, commercially available from Aldrich Chemical Co., Milwaukee, Wis.); flame retardant epoxy monomers (for example, one available under the trade designation "DER-542", a brominated bisphenol type epoxy monomer available from Dow Chemical Co., Midland, Mich.); 1,4-butanediol diglycidyl ether (for example, one available under the trade designation "ARALDITE RD-2" from Ciba Specialty Chemicals); hydrogenated bisphenol A-epichlorohydrin based epoxy monomers (for example, one available under the trade designation "EPONEX 1510" from Hexion Specialty Chemicals, Inc.); polyglycidyl ether of phenol-formaldehyde novolak (for example, one available under the trade designation "DEN-431" and "DEN-438" from Dow Chemical Co.); and epoxidized vegetable oils such as epoxidized linseed and soybean oils available under the trade designations "VIKOLOX" and "VIKOFLEX" from Atofina Chemicals (Philadelphia, Pa.).

Additional suitable epoxy resins include alkyl glycidyl ethers commercially available from Hexion Specialty Chemicals, Inc. (Columbus, Ohio) under the trade designation "HELOXY". Exemplary monomers include "HELOXY MODFIER 7" (a $C_8$-$C_{10}$ alky glycidyl ether), "HELOXY MODIFIER 8" (a $C_{12}$-$C_{14}$ alkyl glycidyl ether), "HELOXY MODIFIER 61" (butyl glycidyl ether), "HELOXY MODIFER 62" (cresyl glycidyl ether), "HELOXY MODIFER 65" (p-tert-butylphenyl glycidyl ether), "HELOXY MODIFER 67" (diglycidyl ether of 1,4-butanediol), "HELOXY 68" (diglycidyl ether of neopentyl glycol), "HELOXY MODIFER 107" (diglycidyl ether of cyclohexanedimethanol), "HELOXY MODIFER 44" (trimethylol ethane triglycidyl ether), "HELOXY MODIFIER 48" (trimethylol propane triglycidyl ether), "HELOXY MODIFER 84" (polyglycidyl ether of an aliphatic polyol), and "HELOXY MODIFER 32" (polyglycol diepoxide).

Other useful epoxy resins comprise copolymers of acrylic acid esters of glycidol (such as glycidyl acrylate and glycidyl methacrylate) with one or more copolymerizable vinyl compounds. Examples of such copolymers are 1:1 styrene-glycidyl methacrylate and 1:1 methyl methacrylate-glycidyl acrylate. Other useful epoxy resins are well known and contain such epoxides as epichlorohydrins, alkylene oxides (for example, propylene oxide), styrene oxide, alkenyl oxides (for example, butadiene oxide), and glycidyl esters (for example, ethyl glycidate).

Useful epoxy-functional polymers include epoxy-functional silicones such as those described in U.S. Pat. No. 4,279, 717 (Eckberg et al.), which are commercially available from the General Electric Company. These are polydimethylsiloxanes in which 1-20 mole % of the silicon atoms have been substituted with epoxyalkyl groups (preferably, epoxy cyclohexylethyl, as described in U.S. Pat. No. 5,753,346 (Leir et al.).

Blends of various epoxy-containing materials can also be utilized. Such blends can comprise two or more weight average molecular weight distributions of epoxy-containing compounds (such as low molecular weight (below 200), intermediate molecular weight (about 200 to 1000), and higher molecular weight (above about 1000)). Alternatively or additionally, the epoxy resin can contain a blend of epoxy-containing materials having different chemical natures (such as aliphatic and aromatic) or functionalities (such as polar and non-polar). Other cationically-reactive polymers (such as vinyl ethers and the like) can additionally be incorporated, if desired.

Preferred epoxies include aromatic glycidyl epoxies (for example, the EPON resins available from Hexion Specialty Chemicals, Inc. and the SU-8 resins available from Micro-Chem Corp., Newton, Mass.), and the like, and mixtures thereof. More preferred are the SU-8 resins and mixtures thereof.

Suitable cationally-reactive species also include vinyl ether monomers, oligomers, and reactive polymers (for example, methyl vinyl ether, ethyl vinyl ether, tert-butyl vinyl ether, isobutyl vinyl ether, triethyleneglycol divinyl ether (RAPI-CURE DVE-3, available from International Specialty Products, Wayne, N.J.), trimethylolpropane trivinyl ether, and the VECTOMER divinyl ether resins from Morflex, Inc., Greensboro, N.C. (for example, VECTOMER 1312, VECTOMER 4010, VECTOMER 4051, and VECTOMER 4060 and their equivalents available from other manufacturers)), and mixtures thereof. Blends (in any proportion) of one or more vinyl ether resins and/or one or more epoxy resins can also be utilized. Polyhydroxy-functional materials (such as those described, for example, in U.S. Pat. No. 5,856,373 (Kaisaki et al.)) can also be utilized in combination with epoxy- and/or vinyl ether-functional materials.

Non-curable species include, for example, reactive polymers whose solubility can be increased upon acid- or radical-induced reaction. Such reactive polymers include, for example, aqueous insoluble polymers bearing ester groups that can be converted by photogenerated acid to aqueous soluble acid groups (for example, poly(4-tert-butoxycarbonyloxystyrene). Non-curable species also include the chemically-amplified photoresists described by R. D. Allen, G. M. Wallraff, W. D. Hinsberg, and L. L. Simpson in "High Performance Acrylic Polymers for Chemically Amplified Photoresist Applications," J. Vac. Sci. Technol. B, 9, 3357 (1991). The chemically-amplified photoresist concept is now widely used for microchip manufacturing, especially with sub-0.5 micron (or even sub-0.2 micron) features. In such photoresist systems, catalytic species (typically hydrogen ions) can be generated by irradiation, which induces a cascade of chemical reactions. This cascade occurs when hydrogen ions initiate reactions that generate more hydrogen ions or other acidic species, thereby amplifying reaction rate. Examples of typical acid-catalyzed chemically-amplified photoresist systems include deprotection (for example, t-butoxycarbonyloxystyrene resists as described in U.S. Pat. No. 4,491,628, tetrahydropyran (THP) methacrylate-based materials, THP-phenolic materials such as those described in U.S. Pat. No. 3,779,778, t-butyl methacrylate-based materials such as those described by R. D Allen et al. in Proc. SPIE 2438, 474 (1995), and the like); depolymerization (for example, polyphthalaldehyde-based materials); and rearrangement (for example, materials based on the pinacol rearrangements).

If desired, mixtures of different types of reactive species can be utilized in the photoreactive compositions. For example, mixtures of free-radically-reactive species and cationically-reactive species are also useful.

Photoinitiator System

The photoinitiator system is a multiphoton photoinitiator system, as the use of such a system enables polymerization to be confined or limited to the focal region of a focused beam of light. Such a system preferably is a two- or three-component system that comprises at least one multiphoton photosensitizer, at least one photoinitiator (or electron acceptor), and, optionally, at least one electron donor. Such multi-component systems can provide enhanced sensitivity, enabling photoreaction to be effected in a shorter period of time and thereby reducing the likelihood of problems due to movement of the sample and/or one or more components of the exposure system.

Preferably, the multiphoton photoinitiator system comprises photochemically effective amounts of (a) at least one multiphoton photosensitizer that is capable of simultaneously absorbing at least two photons and that, optionally but preferably, has a two-photon absorption cross-section greater than that of fluorescein; (b) optionally, at least one electron donor compound different from the multiphoton photosensitizer and capable of donating an electron to an electronic excited state of the photosensitizer; and (c) at least one photoinitiator that is capable of being photosensitized by accepting an electron from an electronic excited state of the photosensitizer, resulting in the formation of at least one free radical and/or acid.

Alternatively, the multiphoton photoinitiator system can be a one-component system that comprises at least one photoinitiator. Photoinitiators useful as one-component multi-photon photoinitiator systems include acyl phosphine oxides (for example, those sold by Ciba under the trade name Irgacure™ 819, as well as 2,4,6 trimethyl benzoyl ethoxyphenyl phosphine oxide sold by BASF Corporation under the trade name Lucirin™ TPO-L) and stilbene derivatives with covalently attached sulfonium salt moeties (for example, those described by W. Zhou et al. in Science 296, 1106 (2002)). Other conventional ultraviolet (UV) photoinitiators such as benzil ketal can also be utilized, although their multi-photon photoinitiation sensitivities will generally be relatively low.

Multiphoton photosensitizers, electron donors, and photoinitiators (or electron acceptors) useful in two- and three-component multiphoton photoinitiator systems are described below.

(1) Multiphoton Photosensitizers

Multiphoton photosensitizers suitable for use in the multiphoton photoinitiator system of the photoreactive compositions are those that are capable of simultaneously absorbing at least two photons when exposed to sufficient light. Preferably, the photosensitizers have a two-photon absorption cross-section greater than that of fluorescein (that is, greater than that of 3',6'-dihydroxyspiro[isobenzofuran-1(3H), 9'-[9H]xanthen]3-one). Generally, the preferred cross-section can be greater than about $50 \times 10^{-50}$ cm$^4$ sec/photon, as measured by the method described by C. Xu and W. W. Webb in J. Opt. Soc. Am. B, 13, 481 (1996) (which is referenced by Marder and Perry et al. in International Publication No. WO 98/21521 at page 85, lines 18-22).

More preferably, the two-photon absorption cross-section of the photosensitizer is greater than about 1.5 times that of fluorescein (or, alternatively, greater than about $75 \times 10^{-50}$ cm$^4$ sec/photon, as measured by the above method); even more preferably, greater than about twice that of fluorescein (or, alternatively, greater than about $100 \times 10^{-50}$ cm$^4$ sec/photon); most preferably, greater than about three times that of fluorescein (or, alternatively, greater than about $150 \times 10^{-50}$ cm$^4$ sec/photon); and optimally, greater than about four times that of fluorescein (or, alternatively, greater than about $200 \times 10^{-50}$ cm$^4$ sec/photon).

Preferably, the photosensitizer is soluble in the reactive species (if the reactive species is liquid) or is compatible with the reactive species and with any binders (as described below) that are included in the composition. Most preferably, the photosensitizer is also capable of sensitizing 2-methyl-4,6-bis(trichloromethyl)-s-triazine under continuous irradiation in a wavelength range that overlaps the single photon absorption spectrum of the photosensitizer (single photon absorption conditions), using the test procedure described in U.S. Pat. No. 3,729,313.

Preferably, a photosensitizer can also be selected based in part upon shelf stability considerations. Accordingly, selection of a particular photosensitizer can depend to some extent upon the particular reactive species utilized (as well as upon the choices of electron donor compound and/or photoinitiator).

Particularly preferred multiphoton photosensitizers include those exhibiting large multiphoton absorption cross-sections, such as Rhodamine B (that is, N-[9-(2-carboxyphenyl)-6-(diethylamino)-3H-xanthen-3-ylidene]-N-ethylethanaminium chloride or hexafluoroantimonate) and the four classes of photosensitizers described, for example, by Marder and Perry et al. in International Patent Publication Nos. WO 98/21521 and WO 99/53242. The four classes can be described as follows: (a) molecules in which two donors are connected to a conjugated π(pi)-electron bridge; (b) molecules in which two donors are connected to a conjugated π(pi)-electron bridge which is substituted with one or more electron accepting groups; (c) molecules in which two acceptors are connected to a conjugated π(pi)-electron bridge; and (d) molecules in which two acceptors are connected to a conjugated π(pi)-electron bridge which is substituted with one or more electron donating groups (where "bridge" means a molecular fragment that connects two or more chemical groups, "donor" means an atom or group of atoms with a low ionization potential that can be bonded to a conjugated π(pi)-electron bridge, and "acceptor" means an atom or group of atoms with a high electron affinity that can be bonded to a conjugated π(pi)-electron bridge).

The four above-described classes of photosensitizers can be prepared by reacting aldehydes with ylides under standard Wittig conditions or by using the McMurray reaction, as detailed in International Patent Publication No. WO 98/21521.

Other compounds are described by Reinhardt et al. (for example, in U.S. Pat. Nos. 6,100,405; 5,859,251; and 5,770,737) as having large multiphoton absorption cross-sections, although these cross-sections were determined by a method other than that described above.

Preferred photosensitizers include the following compounds (and mixtures thereof):

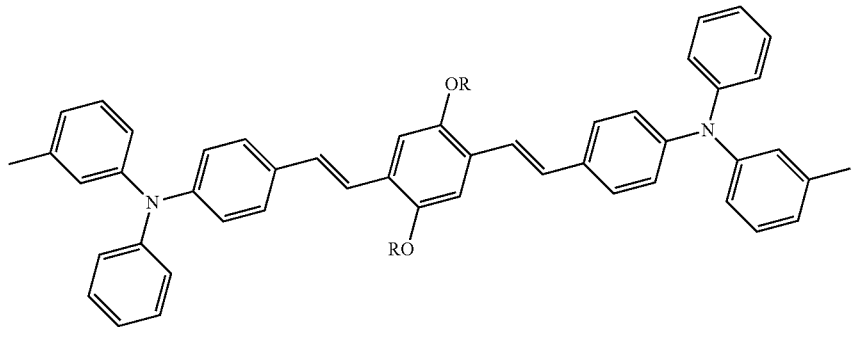

R = C$_{12}$H$_{25}$

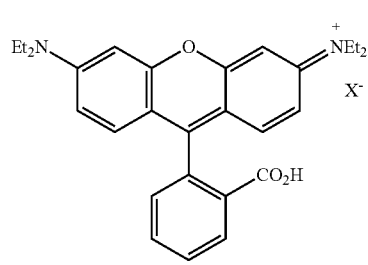

where X$^-$ = Cl$^-$, PF$_6^-$, SbF$_6^-$, AsF$_6^-$, BF$_4^-$, CF$_3$SO$_3^-$

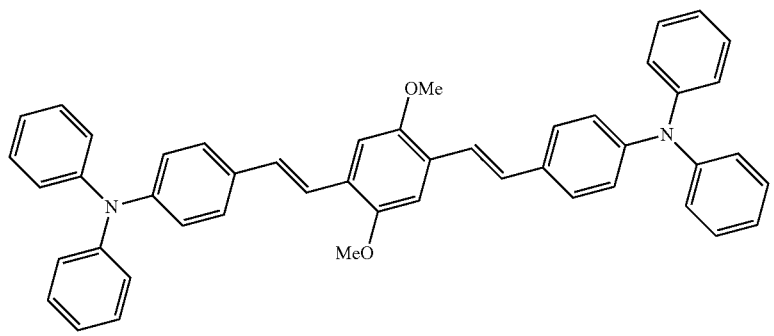

-continued

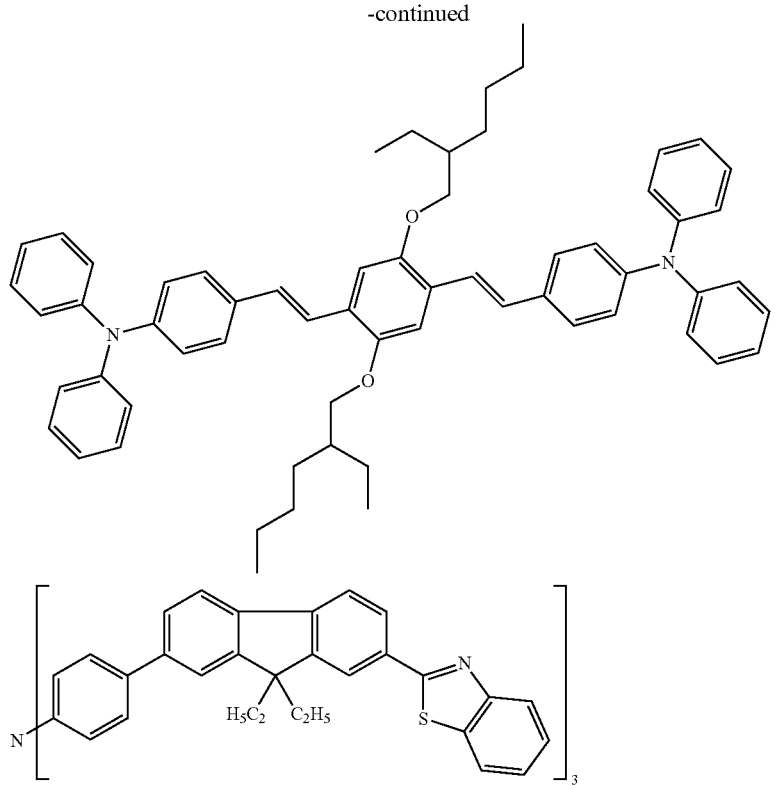

(2) Electron Donor Compounds

Electron donor compounds useful in the multiphoton photoinitiator system of the photoreactive compositions are those compounds (other than the photosensitizer itself) that are capable of donating an electron to an electronic excited state of the photosensitizer. Such compounds may be used, optionally, to increase the multiphoton photosensitivity of the photoinitiator system, thereby reducing the exposure required to effect photoreaction of the photoreactive composition. The electron donor compounds preferably have an oxidation potential that is greater than zero and less than or equal to that of p-dimethoxybenzene. Preferably, the oxidation potential is between about 0.3 and 1 volt vs. a standard saturated calomel electrode ("S.C.E.").

The electron donor compound is also preferably soluble in the reactive species and is selected based in part upon shelf stability considerations (as described above). Suitable donors are generally capable of increasing the speed of cure or the image density of a photoreactive composition upon exposure to light of the desired wavelength.

When working with cationically-reactive species, those skilled in the art will recognize that the electron donor compound, if of significant basicity, can adversely affect the cationic reaction. (See, for example, the discussion in U.S. Pat. No. 6,025,406 (Oxman et al.) at column 7, line 62, through column 8, line 49.)

In general, electron donor compounds suitable for use with particular photosensitizers and photoinitiators can be selected by comparing the oxidation and reduction potentials of the three components (as described, for example, in U.S. Pat. No. 4,859,572 (Farid et al.)). Such potentials can be measured experimentally (for example, by the methods described by R. J. Cox, *Photographic Sensitivity*, Chapter 15, Academic Press (1973)) or can be obtained from references such as N. L. Weinburg, Ed., *Technique of Electroorganic Synthesis Part II Techniques of Chemistry*, Vol. V (1975), and C. K. Mann and K. K. Barnes, *Electrochemical Reactions in Nonaqueous Systems* (1970). The potentials reflect relative energy relationships and can be used to guide electron donor compound selection.

Suitable electron donor compounds include, for example, those described by D. F. Eaton in *Advances in Photochemistry*, edited by B. Voman et al., Volume 13, pp. 427-488, John Wiley and Sons, New York (1986); by Oxman et al. in U.S. Pat. No. 6,025,406 at column 7, lines 42-61; and by Palazzotto et al. in U.S. Pat. No. 5,545,676 at column 4, line 14 through column 5, line 18. Such electron donor compounds include amines (including triethanolamine, hydrazine, 1,4-diazabicyclo[2.2.2]octane, triphenylamine (and its triphenylphosphine and triphenylarsine analogs), aminoaldehydes, and aminosilanes), amides (including phosphoramides), ethers (including thioethers), ureas (including thioureas), sulfinic acids and their salts, salts of ferrocyanide, ascorbic acid and its salts, dithiocarbamic acid and its salts, salts of xanthates, salts of ethylene diamine tetraacetic acid, salts of $(alkyl)_n(aryl)_m$borates (n+m=4) (tetraalkylammonium salts preferred), various organometallic compounds such as $SnR_4$ compounds (where each R is independently chosen from among alkyl, aralkyl (particularly, benzyl), aryl, and alkaryl groups) (for example, such compounds as $n\text{-}C_3H_7Sn(CH_3)_3$, $(allyl)Sn(CH_3)_3$, and $(benzyl)Sn(n\text{-}C_3H_7)_3$), ferrocene, and the like, and mixtures thereof. The electron donor compound can be unsubstituted or can be substituted with one or more non-interfering substituents. Particularly preferred electron donor compounds contain an electron donor atom (such as a nitrogen, oxygen, phosphorus, or sulfur atom) and an abstractable hydrogen atom bonded to a carbon or silicon atom alpha to the electron donor atom.

Preferred amine electron donor compounds include alkyl-, aryl-, alkaryl- and aralkyl-amines (for example, methylamine, ethylamine, propylamine, butylamine, triethanolamine, amylamine, hexylamine, 2,4-dimethylaniline, 2,3-dimethylaniline, o-, m- and p-toluidine, benzylamine, aminopyridine, N,N'-dimethylethylenediamine, N,N'-diethylethylenediamine, N,N'-dibenzylethylenediamine, N,N'-diethyl-1,3-propanediamine, N,N'-diethyl-2-butene-1,4-diamine, N,N'-dimethyl-1,6-hexanediamine, piperazine, 4,4'-trimethylenedipiperidine, 4,4'-ethylenedipiperidine, p-N,N-dimethyl-aminophenethanol and p-N-dimethylaminobenzonitrile); aminoaldehydes (for example, p-N,N-dimethylaminobenzaldehyde, p-N,N-diethylaminobenzaldehyde, 9-julolidine carboxaldehyde, and 4-morpholinobenzaldehyde); and aminosilanes (for example, trimethylsilylmorpholine, trimethylsilylpiperidine, bis(dimethylamino)diphenylsilane, tris(dimethylamino)methylsilane, N,N-diethylaminotrimethylsilane, tris(dimethylamino)phenylsilane, tris(methylsilyl)amine, tris(dimethylsilyl)amine, bis(dimethylsilyl)amine, N,N-bis(dimethylsilyl)aniline, N-phenyl-N-dimethylsilylaniline, and N,N-dimethyl-N-dimethylsilylamine); and mixtures thereof. Tertiary aromatic alkylamines, particularly those having at least one electron-withdrawing group on the aromatic ring, have been found to provide especially good shelf stability. Good shelf stability has also been obtained using amines that are solids at room temperature. Good photosensitivity has been obtained using amines that contain one or more julolidinyl moieties.

Preferred amide electron donor compounds include N,N-dimethylacetamide, N,N-diethylacetamide, N-methyl-N-phenylacetamide, hexamethylphosphoramide, hexaethylphosphoramide, hexapropylphosphoramide, trimorpholinophosphine oxide, tripiperidinophosphine oxide, and mixtures thereof.

Preferred alkylarylborate salts include
$Ar_3B^-(n-C_4H_9)N^+(C_2H_5)_4$
$Ar_3B^-(n-C_4H_9)N^+(CH_3)_4$
$Ar_3B^-(n-C_4H_9)N^+(n-C_4H_9)_4$
$Ar_3B^-(n-C_4H_9)Li^+$
$Ar_3B^-(n-C_4H_9)N^+(C_6H_{13})_4$
$Ar_3B^-\!-\!(C_4H_9)N^+(CH_3)_3(CH_2)_2CO_2(CH_2)_2CH_3$
$Ar_3B^-\!-\!(C_4H_9)N^+(CH_3)_3(CH_2)_2OCO(CH_2)_2CH_3$
$Ar_3B^-\text{-}(sec\text{-}C_4H_9)N^+(CH_3)_3(CH_2)_2CO_2(CH_2)_2CH_3$
$Ar_3B^-\text{-}(sec\text{-}C_4H_9)N^+(C_6H_{13})_4$
$Ar_3B^-\!-\!(C_4H_9)N^+(C_8H_{17})_4$
$Ar_3B^-\!-\!(C_4H_9)N^+(CH_3)_4$
$(p\text{-}CH_3O\text{—}C_6H_4)_3B^-(n\text{-}C_4H_9)N^+(n\text{-}C_4H_9)_4$
$Ar_3B^-\!-\!(C_4H_9)N^+(CH_3)_3(CH_2)_2OH$
$ArB^-(n\text{-}C_4H_9)_3N^+(CH_3)_4$
$ArB^-(C_2H_5)_3N^+(CH_3)_4$
$Ar_2B^-(n\text{-}C_4H_9)_2N^+(CH_3)_4$
$Ar_3B^-(C_4H_9)N^+(C_4H_9)_4$
$Ar_4B^-N^+(C_4H_9)_4$
$ArB^-(CH_3)_3N^+(CH_3)_4$
$(n\text{-}C_4H_9)_4B^-N^+(CH_3)_4$
$Ar_3B^-(C_4H_9)P^+(C_4H_9)_4$
(where Ar is phenyl, naphthyl, substituted (preferably, fluoro-substituted) phenyl, substituted naphthyl, and like groups having greater numbers of fused aromatic rings), as well as tetramethylammonium n-butyltriphenylborate and tetrabutylammonium n-hexyl-tris(3-fluorophenyl)borate, and mixtures thereof.

Suitable ether electron donor compounds include 4,4'-dimethoxybiphenyl, 1,2,4-trimethoxybenzene, 1,2,4,5-tetramethoxybenzene, and the like, and mixtures thereof. Suitable urea electron donor compounds include N,N'-dimethylurea, N,N-dimethylurea, N,N'-diphenylurea, tetramethylthiourea, tetraethylthiourea, tetra-n-butylthiourea, N,N-di-n-butylthiourea, N,N'-di-n-butylthiourea, N,N-diphenylthiourea, N,N'-diphenyl-N,N'-diethylthiourea, and the like, and mixtures thereof.

Preferred electron donor compounds for free radical-induced reactions include amines that contain one or more julolidinyl moieties, alkylarylborate salts, and salts of aromatic sulfinic acids. However, for such reactions, the electron donor compound can also be omitted, if desired (for example, to improve the shelf stability of the photoreactive composition or to modify resolution, contrast, and reciprocity). Preferred electron donor compounds for acid-induced reactions include 4-dimethylaminobenzoic acid, ethyl 4-dimethylaminobenzoate, 3-dimethylaminobenzoic acid, 4-dimethylaminobenzoin, 4-dimethylaminobenzaldehyde, 4-dimethylaminobenzonitrile, 4-dimethylaminophenethyl alcohol, and 1,2,4-trimethoxybenzene.

(3) Photoinitiators

Suitable photoinitiators (that is, electron acceptor compounds) for the reactive species of the photoreactive compositions are those that are capable of being photosensitized by accepting an electron from an electronic excited state of the multiphoton photosensitizer, resulting in the formation of at least one free radical and/or acid. Such photoinitiators include iodonium salts (for example, diaryliodonium salts), sulfonium salts (for example, triarylsulfonium salts optionally substituted with alkyl or alkoxy groups, and optionally having 2,2' oxy groups bridging adjacent aryl moieties), and the like, and mixtures thereof.

The photoinitiator is preferably soluble in the reactive species and is preferably shelf-stable (that is, does not spontaneously promote reaction of the reactive species when dissolved therein in the presence of the photosensitizer and the electron donor compound). Accordingly, selection of a particular photoinitiator can depend to some extent upon the particular reactive species, photosensitizer, and electron donor compound chosen, as described above. If the reactive species is capable of undergoing an acid-initiated chemical reaction, then the photoinitiator is an onium salt (for example, an iodonium or sulfonium salt).

Suitable iodonium salts include those described by Palazzotto et al. in U.S. Pat. No. 5,545,676 at column 2, lines 28 through 46. Suitable iodonium salts are also described in U.S. Pat. Nos. 3,729,313, 3,741,769, 3,808,006, 4,250,053 and 4,394,403. The iodonium salt can be a simple salt (for example, containing an anion such as $Cl^-$, $Br^-$, $I^-$ or $C_4H_5SO_3^-$) or a metal complex salt (for example, containing $SbF_6^-$, $PF_6^-$, $BF_4^-$, tetrakis(perfluorophenyl)borate, $SbF_5OH^-$ or $AsF_6^-$). Mixtures of iodonium salts can be used if desired.

Examples of useful aromatic iodonium complex salt photoinitiators include diphenyliodonium tetrafluoroborate; di(4-methylphenyl)iodonium tetrafluoroborate; phenyl-4-methylphenyliodonium tetrafluoroborate; di(4-heptylphenyl)iodonium tetrafluoroborate; di(3-nitrophenyl)iodonium hexafluorophosphate; di(4-chlorophenyl)iodonium hexafluorophosphate; di(naphthyl)iodonium tetrafluoroborate; di(4-trifluoromethylphenyl)iodonium tetrafluoroborate; diphenyliodonium hexafluorophosphate; di(4-methylphenyl) iodonium hexafluorophosphate; diphenyliodonium hexafluoroarsenate; di(4-phenoxyphenyl)iodonium tetrafluoroborate; phenyl-2-thienyliodonium hexafluorophosphate; 3,5-dimethylpyrazolyl-4-phenyliodonium hexafluorophosphate; diphenyliodonium hexafluoroantimonate; 2,2'-diphenyliodonium tetrafluoroborate; di(2,4-dichlorophenyl) iodonium hexafluorophosphate; di(4-bromophenyl)

iodonium hexafluorophosphate; di(4-methoxyphenyl)iodonium hexafluorophosphate; di(3-carboxyphenyl)iodonium hexafluorophosphate; di(3-methoxycarbonylphenyl)iodonium hexafluorophosphate; di(3-methoxysulfonylphenyl)iodonium hexafluorophosphate; di(4-acetamidophenyl)iodonium hexafluorophosphate; di(2-benzothienyl)iodonium hexafluorophosphate; and diphenyliodonium hexafluoroantimonate; and the like; and mixtures thereof. Aromatic iodonium complex salts can be prepared by metathesis of corresponding aromatic iodonium simple salts (such as, for example, diphenyliodonium bisulfate) in accordance with the teachings of Beringer et al., J. Am. Chem. Soc. 81, 342 (1959).

Preferred iodonium salts include diphenyliodonium salts (such as diphenyliodonium chloride, diphenyliodonium hexafluorophosphate, and diphenyliodonium tetrafluoroborate), diaryliodonium hexafluoroantimonate (for example, SarCat™ SR 1012 available from Sartomer Company), and mixtures thereof.

Useful sulfonium salts include those described in U.S. Pat. No. 4,250,053 (Smith) at column 1, line 66, through column 4, line 2, which can be represented by the formulas:

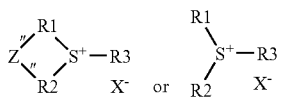

wherein $R_1$, $R_2$, and $R_3$ are each independently selected from aromatic groups having from about 4 to about 20 carbon atoms (for example, substituted or unsubstituted phenyl, naphthyl, thienyl, and furanyl, where substitution can be with such groups as alkoxy, alkylthio, arylthio, halogen, and so forth) and alkyl groups having from 1 to about 20 carbon atoms. As used here, the term "alkyl" includes substituted alkyl (for example, substituted with such groups as halogen, hydroxy, alkoxy, or aryl). At least one of $R_1$, $R_2$, and $R_3$ is aromatic, and, preferably, each is independently aromatic. Z is selected from the group consisting of a covalent bond, oxygen, sulfur, —S(=O)—, —C(=O)—, —(O=)S(=O)—, and —N(R)—, where R is aryl (of about 6 to about 20 carbons, such as phenyl), acyl (of about 2 to about 20 carbons, such as acetyl, benzoyl, and so forth), a carbon-to-carbon bond, or —($R_4$=)C(—$R_5$)—, where $R_4$ and $R_5$ are independently selected from the group consisting of hydrogen, alkyl groups having from 1 to about 4 carbon atoms, and alkenyl groups having from about 2 to about 4 carbon atoms. $X^-$ is an anion, as described below.

Suitable anions, $X^-$, for the sulfonium salts (and for any of the other types of photoinitiators) include a variety of anion types such as, for example, imide, methide, boron-centered, phosphorous-centered, antimony-centered, arsenic-centered, and aluminum-centered anions.

Illustrative, but not limiting, examples of suitable imide and methide anions include $(C_2F_5SO_2)_2N^-$, $(C_4F_9SO_2)_2N^-$, $(C_8F_{17}SO_2)_3C^-$, $(CF_3SO_2)_3C^-$, $(CF_3SO_2)_2N^-$, $(C_4F_9SO_2)_3C^-$, $(CF_3SO_2)_2(C_4F_9SO_2)C^-$, $(CF_3SO_2)(C_4F_9SO_2)N^-$, $((CF_3)_2NC_2F_4SO_2)_2N^-$, $(CF_3)_2NC_2F_4SO_2C^-(SO_2CF_3)_2$, $(3,5$-bis$(CF_3)C_6H_3)SO_2N^-SO_2CF_3$, $C_6H_5SO_2C^-(SO_2CF_3)_2$, $C_6H_5SO_2N^-SO_2CF_3$, and the like. Preferred anions of this type include those represented by the formula $(R_fSO_2)_3C^-$, wherein $R_f$ is a perfluoroalkyl radical having from 1 to about 4 carbon atoms.

Illustrative, but not limiting, examples of suitable boron-centered anions include $F_4B^-$, $(3,5$-bis$(CF_3)C_6H_3)_4B^-$, $(C_6F_5)_4B^-$, (p-$CF_3C_6H_4)_4B^-$, (m-$CF_3C_6H_4)_4B^-$, (p-$FC_6H_4)_4B^-$, $(C_6F_5)_3(CH_3)B^-$, $(C_6F_5)_3$(n-$C_4H_9)B^-$, (p-$CH_3C_6H_4)_3(C_6F_5)B^-$, $(C_6F_5)_3FB^-$, $(C_6H_5)_3(C_6F_5)B^-$, $(CH_3)_2$(p-$CF_3C_6H_4)_2B^-$, $(C_6F_5)_3$(n-$C_{18}H_{37}O)B^-$, and the like. Preferred boron-centered anions generally contain 3 or more halogen-substituted aromatic hydrocarbon radicals attached to boron, with fluorine being the most preferred halogen. Illustrative, but not limiting, examples of the preferred anions include $(3,5$-bis$(CF_3)C_6H_3)_4B^-$, $(C_6F_5)_4B^-$, $(C_6F_5)_3$(n-$C_4H_9)B^-$, $(C_6F_5)_3FB^-$, and $(C_6F_5)_3(CH_3)B^-$.

Suitable anions containing other metal or metalloid centers include, for example, $(3,5$-bis$(CF_3)C_6H_3)_4Al^-$, $(C_6F_5)_4Al^-$, $(C_6F_5)_2F_4P^-$, $(C_6F_5)F_5P^-$, $F_6P^-$, $(C_6F_5)F_5Sb^-$, $F_6Sb^-$, (HO)$F_5Sb^-$, and $F_6As^-$. The foregoing lists are not intended to be exhaustive, as other useful boron-centered nonnucleophilic salts, as well as other useful anions containing other metals or metalloids, will be readily apparent (from the foregoing general formulas) to those skilled in the art.

Preferably, the anion, $X^-$, is selected from tetrafluoroborate, hexafluorophosphate, hexafluoroarsenate, hexafluoroantimonate, and hydroxypentafluoroantimonate (for example, for use with cationically-reactive species such as epoxy resins).

Examples of suitable sulfonium salt photoinitiators include:
triphenylsulfonium tetrafluoroborate
methyldiphenylsulfonium tetrafluoroborate
dimethylphenylsulfonium hexafluorophosphate
triphenylsulfonium hexafluorophosphate
triphenylsulfonium hexafluoroantimonate
diphenylnaphthylsulfonium hexafluoroarsenate
tritolysulfonium hexafluorophosphate
anisyldiphenylsulfonium hexafluoroantimonate
4-butoxyphenyldiphenylsulfonium tetrafluoroborate
4-chlorophenyldiphenylsulfonium hexafluorophosphate
tri(4-phenoxyphenyl)sulfonium hexafluorophosphate
di(4-ethoxyphenyl)methylsulfonium hexafluoroarsenate
4-acetonylphenyldiphenylsulfonium tetrafluoroborate
4-thiomethoxyphenyldiphenylsulfonium hexafluorophosphate
di(methoxysulfonylphenyl)methylsulfonium hexafluoroantimonate
di(nitrophenyl)phenylsulfonium hexafluoroantimonate
di(carbomethoxyphenyl)methylsulfonium hexafluorophosphate
4-acetamidophenyldiphenylsulfonium tetrafluoroborate
dimethylnaphthylsulfonium hexafluorophosphate
trifluoromethyldiphenylsulfonium tetrafluoroborate
p-(phenylthiophenyl)diphenylsulfonium hexafluoroantimonate
10-methylphenoxathiinium hexafluorophosphate
5-methylthianthrenium hexafluorophosphate
10-phenyl-9,9-dimethylthioxanthenium hexafluorophosphate
10-phenyl-9-oxothioxanthenium tetrafluoroborate
5-methyl-10-oxothianthrenium tetrafluoroborate
5-methyl-10,10-dioxothianthrenium hexafluorophosphate Preferred sulfonium salts include triaryl-substituted salts such as triarylsulfonium hexafluoroantimonate (for example, SarCat™ SR1010 available from Sartomer Company), triarylsulfonium hexafluorophosphate (for example, SarCat™ SR 1011 available from Sartomer Company), and triarylsulfonium hexafluorophosphate (for example, SarCat™ K185 available from Sartomer Company).

Preferred photoinitiators include iodonium salts (more preferably, aryliodonium salts), sulfonium salts, and mixtures thereof. More preferred are aryliodonium salts and mixtures thereof.

Preparation of Photoreactive Composition

The reactive species, multiphoton photosensitizers, electron donor compounds, and photoinitiators can be prepared by the methods described above or by other methods known in the art, and many are commercially available. These four components can be combined under "safe light" conditions using any order and manner of combination (optionally, with stirring or agitation), although it is sometimes preferable (from a shelf life and thermal stability standpoint) to add the photoinitiator last (and after any heating step that is optionally used to facilitate dissolution of other components). Solvent can be used, if desired, provided that the solvent is chosen so as to not react appreciably with the components of the composition. Suitable solvents include, for example, acetone, dichloromethane, and acetonitrile. The reactive species itself can also sometimes serve as a solvent for the other components.

The three components of the photoinitiator system are present in photochemically effective amounts (as defined above). Generally, the composition can contain at least about 5% (preferably, at least about 10%; more preferably, at least about 20%) up to about 99.79% (preferably, up to about 95%; more preferably, up to about 80%) by weight of one or more reactive species; at least about 0.01% (preferably, at least about 0.1%; more preferably, at least about 0.2%) up to about 10% (preferably, up to about 5%; more preferably, up to about 2%) by weight of one or more photosensitizers; optionally, up to about 10% (preferably, up to about 5%) by weight of one or more electron donor compounds (preferably, at least about 0.1%; more preferably, from about 0.1% to about 5%); and from about 0.1% to about 10% by weight of one or more electron acceptor compounds (preferably, from about 0.1% to about 5%) based upon the total weight of solids (that is, the total weight of components other than solvent).

A wide variety of adjuvants can be included in the photoreactive compositions, depending upon the desired end use. Suitable adjuvants include solvents, diluents, resins, binders, plasticizers, pigments, dyes, inorganic or organic reinforcing or extending fillers (at preferred amounts of about 10% to 90% by weight based on the total weight of the composition), thixotropic agents, indicators, inhibitors, stabilizers, ultraviolet absorbers, and the like. The amounts and types of such adjuvants and their manner of addition to the compositions will be familiar to those skilled in the art.

It is within the scope of this invention to include nonreactive polymeric binders in the compositions in order, for example, to control viscosity and to provide film-forming properties. Such polymeric binders can generally be chosen to be compatible with the reactive species. For example, polymeric binders that are soluble in the same solvent that is used for the reactive species, and that are free of functional groups that can adversely affect the course of reaction of the reactive species, can be utilized. Binders can be of a molecular weight suitable to achieve desired film-forming properties and solution rheology (for example, molecular weights between about 5,000 and 1,000,000 Daltons; preferably between about 10,000 and 500,000 Daltons; more preferably, between about 15,000 and 250,000 Daltons). Suitable polymeric binders include, for example, polystyrene, poly(methyl methacrylate), poly(styrene)-co-(acrylonitrile), cellulose acetate butyrate, and the like.

Prior to exposure, the resulting photoreactive compositions can be coated on a substrate, if desired, by any of a variety of coating methods known to those skilled in the art (including, for example, knife coating and spin coating). The substrate can be chosen from a wide variety of films, sheets, and other surfaces (including silicon wafers and glass plates), depending upon the particular application and the method of exposure to be utilized. Preferred substrates are generally sufficiently flat to enable the preparation of a layer of photoreactive composition having a uniform thickness. For applications where coating is less desirable, the photoreactive compositions can alternatively be exposed in bulk form.

Exposure System and its Use

In carrying out the process of the invention, a photoreactive composition can be exposed to light under conditions such that multiphoton absorption occurs, thereby causing a region of differential solubility characteristics (for example, lesser or greater solubility in a particular solvent) as compared to the photoreactive composition prior to exposure. Such exposure can be accomplished by any known means capable of achieving sufficient intensity of the light.

One exemplary type of system that can be used is shown in FIG. 1. Referring to FIG. 1, fabrication system 10 includes light source 12, optical system 14 comprising a final optical element 15 (optionally including galvo-mirrors and a telescope to control beam divergence), and moveable stage 16. Stage 16 is moveable in one, two, or, more typically, three dimensions. Substrate 18 mounted on stage 16 has a layer 20 of photoreactive composition 24 thereon. Light beam 26 originating from light source 12 passes through optical system 14 and leaves through final optical element 15 which focuses it to a point P within layer 20, thereby controlling the three-dimensional spatial distribution of light intensity within the composition and causing at least a portion of photoreactive composition 24 in the vicinity of point P to become more, or less, soluble in at least one solvent than it was immediately prior to exposure to light beam 26.

By moving stage 16, or by directing light beam 26 (for example, moving a laser beam using galvo-mirrors and a telescope) in combination with moving one or more elements of optical system 14, the focal point P can be scanned or translated in a three-dimensional pattern that corresponds to a desired shape. The resulting reacted or partially reacted portion of photoreactive composition 24 then creates a three-dimensional structure of the desired shape. For example, in a single pass the surface profile (corresponding to a thickness of about one volume pixel or voxel) of one or more microlenses can be exposed or imaged, which upon development can form the surface of the microlens(es).

The exposure or imaging of the surface profile can be carried out by scanning at least the perimeter of a planar slice of a desired three-dimensional structure and then scanning a plurality of preferably parallel, planar slices to complete the structure. Slice thickness can be controlled to achieve a sufficiently low level of surface roughness to provide optical quality microlenses. For example, smaller slice thicknesses can be desirable in regions of greater structure taper to aid in achieving high structure fidelity, but larger slice thicknesses can be utilized in regions of less structure taper to aid in maintaining useful fabrication times. In this way, a surface roughness less than the slice thickness (preferably, less than about one-half of the slice thickness; more preferably, less than about one-quarter of the slice thickness) can be achieved without sacrificing fabrication speed (throughput or number of microlenses fabricated per unit time).

When the photoreactive composition is coated on a substrate that exhibits a degree of non-planarity that is of the same or greater size magnitude as voxel height, it can be desirable to compensate for the non-planarity to avoid optically- or physically-defective microlenses. This can be accomplished by locating (for example, using a confocal interface locator system, interferometry, or fluorescence interface locator system) the position of the interface between the substrate and the portion of the photoreactive composition that is to be exposed, and then adjusting the location of the optical system 14 appropriately to focus light beam 26 at the interface. (Such a procedure is described in detail in a co-pending and co-filed patent application bearing 60/752,529, the description of which is incorporated herein by reference.) Preferably, this procedure can be followed for at least one microlens out of every twenty microlenses in an array (more preferably, at least one out of every ten; most preferably, for each microlens in the array).

Light source 12 can be any light source that produces sufficient light intensity to effect multiphoton absorption. Suitable sources include, for example, femtosecond near-infrared titanium sapphire oscillators (for example, those available from Coherent, Santa Clara, Calif., under the trade designation "MIRA OPTIMA 900-F") pumped by an argon ion laser (for example, those available from Coherent under the trade designation "INNOVA"). This laser, operating at 76 MHz, has a pulse width of less than 200 femtoseconds, is tunable between 700 and 980 nm, and has average power up to 1.4 Watts. Another useful laser is available from Spectra-Physics, Mountain View, Calif., under the trade designation "MAI TAI", tunable to wavelengths in a range of from 750 to 850 nanometers, and having a repetition frequency of 80 megahertz, and a pulse width of about 100 femtoseconds ($1 \times 10^{-13}$ sec), with an average power level up to 1 Watt.

However, any light source (for example, a laser) that provides sufficient intensity to effect multiphoton absorption at a wavelength appropriate for the multiphoton absorber used in the photoreactive composition can be utilized. Such wavelengths can generally be in the range of about 300 to about 1500 nm; preferably, from about 400 to about 1100 nm; more preferably, from about 600 to about 900 nm; more preferably, from about 750 to about 850 nm, inclusive. Typically, the light fluence (for example, peak intensity of a pulsed laser) is greater than about $10^6$ W/cm$^2$. The upper limit on the light fluence is generally dictated by the ablation threshold of the photoreactive composition. For example, Q-switched Nd:YAG lasers (for example, those available from Spectra-Physics under the trade designation "QUANTA-RAY PRO"), visible wavelength dye lasers (for example, those available from Spectra-Physics under the trade designation "SIRAH" pumped by a Q-switched Nd:YAG laser from Spectra-Physics having the trade designation "Quanta-Ray PRO"), and Q-switched diode pumped lasers (for example, those available from Spectra-Physics under the trade designation "FCBAR") can also be utilized.

Preferred light sources are near infrared pulsed lasers having a pulse length less than about $10^{-8}$ second (more preferably, less than about $10^{-9}$ second; most preferably, less than about $10^{-11}$ second). Other pulse lengths can be used as long as the peak intensity and ablation threshold criteria above are met. Pulsed radiation can, for example, have a pulse frequency of from about one kilohertz up to about 50 megahertz, or even more. Continuous wave lasers can also be used.

Optical system 14 can include, for example, refractive optical elements (for example, lenses or microlens arrays), reflective optical elements (for example, retroreflectors or focusing mirrors), diffractive optical elements (for example, gratings, phase masks, and holograms), polarizing optical elements (for example, linear polarizers and waveplates), dispersive optical elements (for example, prisms and gratings), diffusers, Pockels cells, waveguides, and the like. Such optical elements are useful for focusing, beam delivery, beam/mode shaping, pulse shaping, and pulse timing. Generally, combinations of optical elements can be utilized, and other appropriate combinations will be recognized by those skilled in the art. Final optical element 15 can include, for example, one or more refractive, reflective, and/or diffractive optical elements. In one embodiment, an objective such as, for example, those used in microscopy can be conveniently obtained from commercial sources such as, for example, Carl Zeiss, North America, Thornwood, N.Y., and used as final optical element 15. For example, fabrication system 10 can include a scanning confocal microscope (for example, those available from Bio-Rad Laboratories, Hercules, Calif., under the trade designation "MRC600") equipped with a 0.75 numerical aperture (NA) objective (such as, for example, those available from Carl Zeiss, North America under the trade designation "20X FLUAR").

It can often be desirable to use optics with relatively large numerical aperture to provide highly-focused light. However, any combination of optical elements that provides a desired intensity profile (and spatial placement thereof) can be utilized.

Exposure times generally depend upon the type of exposure system used to cause reaction of the reactive species in the photoreactive composition (and its accompanying variables such as numerical aperture, geometry of light intensity spatial distribution, the peak light intensity during the laser pulse (higher intensity and shorter pulse duration roughly correspond to peak light intensity)), as well as upon the nature of the photoreactive composition. Generally, higher peak light intensity in the regions of focus allows shorter exposure times, everything else being equal. Linear imaging or "writing" speeds generally can be about 5 to 100,000 microns/second using a laser pulse duration of about $10^{-8}$ to $10^{-15}$ second (for example, about $10^{-11}$ to $10^{-14}$ second) and about $10^2$ to $10^9$ pulses per second (for example, about $10^3$ to $10^8$ pulses per second).

In order to facilitate solvent development of the exposed photoreactive composition and obtain a fabricated microlens structure, a threshold dose of light (that is, threshold dose) can be utilized. This threshold dose is typically process specific, and can depend on variables such as, for example, the wavelength, pulse frequency, intensity of the light, the specific photoreactive composition, the specific microlens structure being fabricated, or the process used for solvent development. Thus, each set of process parameters can typically be characterized by a threshold dose. Higher doses of light than the threshold can be used, and can be beneficial, but higher doses (once above the threshold dose) can typically be used with a slower writing speed and/or higher light intensity.

Increasing the dose of light tends to increase the volume and aspect ratio of voxels generated by the process. Thus, in order to obtain voxels of low aspect ratio, it is generally preferable to use a light dose that is less than about 10 times the threshold dose, preferably less than about 4 times the threshold dose, and more preferably less than about 3 times the threshold dose. In order to obtain voxels of low aspect ratio, the radial intensity profile of light beam 26 is preferably Gaussian.

Through multiphoton absorption, light beam 26 induces a reaction in the photoreactive composition that produces a volume region of material having solubility characteristics different from those of the unexposed photoreactive composition. The resulting pattern of differential solubility can then be realized by a conventional development process, for example, by removing either exposed or unexposed regions.

The exposed photoreactive composition can be developed, for example, by placing the exposed photoreactive composition into solvent to dissolve regions of higher solvent solubility, by rinsing with solvent, by evaporation, by oxygen plasma etching, by other known methods, and by combinations thereof. Solvents that can be used for developing the exposed photoreactive composition include aqueous solvents such as, for example, water (for example, having a pH in a range of from 1 to 12) and miscible blends of water with organic solvents (for example, methanol, ethanol, propanol, acetone, acetonitrile, dimethylformamide, N-methylpyrrolidone, and the like, and mixtures thereof); and organic solvents. Exemplary useful organic solvents include alcohols (for example, methanol, ethanol, and propanol), ketones (for example, acetone, cyclopentanone, and methyl ethyl ketone), aromatics (for example, toluene), halocarbons (for example, methylene chloride and chloroform), nitriles (for example, acetonitrile), esters (for example, ethyl acetate and propylene glycol methyl ether acetate), ethers (for example, diethyl ether and tetrahydrofuran), amides (for example, N-methylpyrrolidone), and the like, and mixtures thereof.

An optional bake after exposure to light under multiphoton absorption conditions, but prior to solvent development, can be useful for some photoreactive compositions such as, for example, epoxy-type reactive species. Typical bake conditions include temperatures in a range of from about 40° C. to about 200° C., for times in a range of from about 0.5 minutes to about 20 minutes.

Optionally, after exposure of only the surface profile of a microlens array, preferably followed by solvent development, a nonimagewise exposure using actinic radiation can be carried out to effect reaction of the remaining unreacted photoreactive composition. Such a nonimagewise exposure can preferably be carried out by using a one-photon process.

Complex three-dimensional microlenses and microlens arrays can be prepared in this manner.

Microlens Arrays

The process of the invention can be used to flexibly and controllably provide microlens arrays comprising microlenses of a variety of sizes and surface profiles (including, for example, both convex and concave microlenses). The process can be particularly well-suited, however, for providing arrays comprising aspherical microlenses, arrays of microlenses having relatively low f numbers, microlens arrays having high fill factors, and microlens arrays exhibiting a controlled spatial variation of principal axis and/or focal length across the array.

For example, the process can be used to fabricate microlens arrays comprising microlenses having diameters of less than about 1 millimeter (preferably, less than about 400 microns; more preferably, less than about 120 microns; most preferably, less than about 50 microns) and/or f numbers of less than about 10 (preferably, less than about 2; more preferably, less than about 1). A wide range of fill factors (up to 100 percent) can be achieved. For many applications, fill factors of about 50 percent to 100 percent (preferably, about 90 percent to 100 percent) can be useful. Microlenses with spherical- and polygonal-shaped boundaries, for example, can be fabricated with array fill factors up to 100 percent. In fabricating the arrays, negative conic constants (a parameter related to the deviation of microlens surface profile from spherical) can be preferred over positive conic constants, in order to minimize spherical aberrations. Tilt angles of up to about 80 degrees (preferably, up to about 25 degrees) can be achieved, depending upon fill factor, microlens focal length, and the desired field of view.

Thus, the process can be especially useful for fabricating arrays of small microlenses with large sag (preferably, at least about 1/10 of microlens diameter; more preferably, at least about ¼ of microlens diameter; most preferably, at least about ½ of microlens diameter) and well-controlled aspheric profile. In addition, the process can be used to fabricate patterned or random, heterogeneous microlens array masterforms with multiple microlens designs (including radius of curvature, aspheric profile, and orientation of principal axis) in a single writing process. Average surface roughnesses of $\lambda/2$ (preferably, $\lambda/4$; more preferably, $\lambda/10$; most preferably, $\lambda/20$) can be achieved (where $\lambda$ (lambda) is the wavelength of light for which the microlens is designed; hereinafter the "operating wavelength").

The process of the invention can be used to fabricate arrays of radially symmetric microlenses. Such arrays comprise only microlenses that are radially symmetric about their principal axes. In addition to aspherical microlenses, the radially symmetric microlens arrays can further comprise spherical microlenses. Preferably, however, at least a majority (more preferably, substantially all (for example, at least about 90 percent); most preferably, all) of the microlenses in these arrays (or in other arrays prepared by the process of the invention) are aspherical and/or have one or more of the above-described preferred characteristics.

Radially symmetric microlenses can be used to focus light at a point defined by the geometry of the microlens. The geometric parameters (for example, aspheric microlens sag, base diameter, and conic constant; and spheric microlens radius) of the microlenses, as well as the refractive index of the material from which the microlens is formed, can be varied to achieve a desired focal length.

The fill factor of the arrays can be varied to control the contrast of a focused image and to counter cross-talk between microlenses (which can produce "ghost" images). The packing arrangement of the microlenses can be regular (for example, square or hexagonal) or irregular. The focal lengths of the microlenses comprising the array can also vary throughout the array. For example, the focal lengths can be varied in a continuous or linear manner (to achieve field correction) or can be varied randomly (to achieve diffusion of an image).

Arrays of radially symmetric microlenses can be used as diffusers for displays (for example, for liquid crystal display (LCD) televisions) and for focusing an image on a charge-coupled device (CCD) array.

The process of the invention can also be used to fabricate microlens arrays comprising one or more anamorphic microlenses. Such microlenses can expand or compress an image in one image plane more than another image plane. Lenses of this type are widely used in cameras and televisions to enable wide image displays (for example, images with a 16:9 aspect ratio) to fit on a standard detector (for example, a detector with a 4:3 aspect ratio). Anamorphic lenses can also be used to modify a laser beam to control its spatial profile in the plane orthogonal to its principal axis. For example, it can often be desirable to make an elliptical beam profile less elliptical (more circular), and that can be accomplished by using an anamorphic lens to compress the major axis of the ellipse profile or to expand the minor axis of the ellipse profile.

Similarly, anamorphic lenses can be used to modify the laser beams produced by edge-emitting semiconductor lasers, which typically have a rectangular emitting aperture. As a result of this aperture shape, the emitted beam typically has a larger divergence angle in a direction perpendicular to the device junction of the laser (due to the smaller aperture dimension) than in the direction parallel to the device junction (where the emitting aperture dimension is larger). This difference in divergence results in astigmatism, in which the location of the effective point source from which the beam appears to emanate is displaced (along the propagation direction of the beam) in the two directions that form a plane orthogonal to the propagation direction. The formation of a collimated beam (preferably, one that has a circular cross-section) from this diverging source can be desirable for effective use in a variety of applications. A collimated beam can be formed by placement of an appropriate anamorphic microlens at a proper distance in front of the emitting aperture. Arrays of such anamorphic microlenses can be used in conjunction with laser diode arrays containing multiple emitting apertures.

The process of the invention can also be used to fabricate microlens arrays comprising at least two microlenses that have different principal axes (hereinafter, termed "tilted microlens" arrays). This can be achieved, for example, by making a radially asymmetric microlens having a base that is coplanar with the base of at least one other microlens in the array, or by making a radially symmetric microlens having a plane defined by the perimeter of its base that intersects the plane defined by the perimeter of the base of at least one other microlens in the array. Such arrays can exhibit an independent variation in tilt angle from microlens to microlens across the array. For many applications, however, it can be preferred to introduce a degree of tilt symmetry.

For example, one such array is a 3×3 square-packed array, wherein the center microlens is radially symmetric (having a principal axis that is perpendicular to the plane defined by the perimeter of the base of the microlens), and the microlenses surrounding the center microlens are radially asymmetric (each having a principal axis that is, for example, tilted toward the center microlens at a pre-defined angle relative to the plane defined by the perimeter of the base of the radially asymmetric microlens). (This pattern can be repeated to form a larger array comprising multiple 3×3 subsections, if desired.) It can also be useful for some applications, however, to reduce the tilt angle symmetry of the array so as to produce an asymmetrical variation in tilt angle (for example, by randomization or by design). Tilted microlenses can serve dual optical functions in an array in the form of a focal function (as defined by the refractive index of the material comprising the microlens and by microlens geometry, for example, height and base diameter) and in the form of alteration of the direction of propagation of incident light.

In addition to aspherical microlenses (which are useful in correcting spherical aberration), the tilted microlens arrays can further comprise spherical microlenses. The fill factor of the arrays can also be varied to control the contrast of a focused image and to counter cross-talk between microlenses (which can produce "ghost" images). The packing arrangement of the microlenses can be regular (for example, square or hexagonal) or irregular. The focal lengths of the microlenses comprising the array can vary throughout the array.

In imaging applications, tilted microlens arrays can be used to increase the field of view.

EXAMPLES

Objects and advantages of this invention are further illustrated by the following examples, but the particular materials and amounts thereof recited in these examples, as well as other conditions and details, should not be construed to unduly limit this invention. Unless otherwise noted, all procedures were carried out under a dry nitrogen atmosphere with dry and deoxygenated solvents and reagents. Unless otherwise noted, all solvents and reagents were or can be obtained from Aldrich Chemical Co., Milwaukee, Wis.

Rhodamine B hexafluoroantimonate was prepared by metathesis of Rhodamine B chloride with sodium hexafluoroantimonate.

As used herein,

"SR368" refers to tris-(2-hydroxyethyl)isocyanurate triacrylate, obtained from Sartomer Co., Inc., Exton, Pa.;

"SR9008" refers to a trifunctional acrylate ester obtained from Sartomer Co., Inc., Exton, Pa.;

"SR1012" refers to diaryliodonium hexafluoroantimonate, obtained from Sartomer Co., Inc., Exton, Pa.;

"SU-8 R2150" refers to an epoxy negative photoresist obtained from MicroChem Corp., Newton, Mass.;

"PGMEA" refers to poly(ethylene glycol) methyl ether acetate;

"THF" refers to tetrahydrofuran;

"PHOTOMER 6210" refers to an aliphatic urethane diacrylate, manufactured by Cognis Corp. USA, Cincinnati, Ohio;

"SARTOMER 238" refers to hexanediol diacrylate, available from Sartomer Co., Inc., Exton, Pa.;

"IRGACURE 819" refers to an acylphosphine oxide photoinitiator, available from Ciba Specialty Chemicals, Tarrytown, N.Y.;

"CGI 7460" refers to tetrabutylammonium n-hexyl-tris(3-fluorophenyl)borate, obtained from Ciba Specialty Chemicals, Tarrytown, N.Y.

Example 1

Fabrication of a Microlens Array

A circular silicon wafer (10.2 cm (4 inches) in diameter; obtained from Wafer World, Inc., West Palm Beach, Fla.) was cleaned by soaking it for approximately ten minutes in a 3:1 volume/volume (v/v) mixture of concentrated sulfuric acid and 30 weight percent aqueous hydrogen peroxide. The wafer was then rinsed with deionized water and then with isopropanol, after which it was dried under a stream of air. The wafer was then dipped into a two weight percent solution of 3-(trimethoxysilyl)propyl methacrylate in 190-proof ethanol that had been made acidic (pH between 4 and 5) with acetic acid. The wafer was then rinsed with absolute ethanol and was then heated in an oven at 130° C. for ten minutes.

Poly(methyl methacrylate), having a number average molecular weight of approximately 120,000, SR9008, and SR368 were combined in a weight ratio of 30:35:35 to provide a monomer mixture, and this monomer mixture was dissolved in sufficient 1,2-dichloroethane to afford a solution that was 54 weight percent of the monomer mixture. To this solution there were then added aliquots of concentrated solutions of photosensitizer Rhodamine B hexafluoroantimonate in THF and SR1012 in THF sufficient to give a coating solution that was 0.5 weight percent Rhodamine B hexafluoroantimonate and 1.0 weight percent SR1012, based on the total weight of solids. This coating solution was filtered through a 1-micron syringe filter and was spin-coated onto the silicon wafer. The wafer was placed in a forced air oven at 60° C. for 18 hours to afford a coated silicon wafer with a substantially solvent-free (hereinafter, "dry") coating thickness of approximately 30 micrometers.

Two-photon polymerization of the dry coating was carried out in the following manner, using a diode-pumped Ti:sapphire laser (Spectra-Physics, Mountain View, Calif.) operating at a wavelength of 800 nm, nominal pulse width of 80 fs, pulse repetition rate of 80 MHz, and average power of approximately 1 W. The coated wafer was placed on a computer-controllable three-axis stage (obtained from Aerotech, Inc., Pittsburgh, Pa.). The laser beam was attenuated by neutral density filters and was focused into the dry coating using a galvoscanner with telescope for x, y, and z-axis control (available from Nutfield Technology, Inc., Windham, N.H.)

and a microscope objective lens (having a numeric aperture of 1.4) that was immersed in Type A immersion oil (available from Cargille Laboratories, Cedar Grove, N.J.), which was applied directly on the surface of the dry coating. The average power was measured at the output of the objective lens using a wavelength-calibrated photodiode (obtained from Ophir Optronics, Ltd., Wilmington, Mass.) and was determined to be approximately 8 mW.

The interface between the wafer and the dry coating was determined by monitoring the two-photon fluorescence of the photosensitizer as a function of z-axis location. The galvoscanner was programmed to irradiate in a pattern, at a scan rate of approximately 700 micrometers per second, to give a 3 microlens by 6 microlens array of solid microlenses that were each to be approximately 25 micrometers in diameter and that each were to have a surface that can be described by Equation 1

$$r^2 = a^2x^2 + b^2y^2 + c^2z^2 \quad (1)$$

where r=13.5 micrometers, a=1, b=1.4, and c=0.66. The resulting irradiated sample was developed in PGMEA. An array of 18 aspherical microlenses was fabricated by this method and was analyzed by optical microscopy and electron microscopy. Each lens was found to have a sag of approximately 25 micrometers and to tilt away from the center of the array.

Example 2

Fabrication of a Microlens Array

A circular silicon wafer (10.2 cm (4 inches) in diameter; obtained from Wafer World, Inc., West Palm Beach, Fla.) obtained from was cleaned by soaking it for approximately ten minutes in a 3:1 v/v mixture of concentrated sulfuric acid and 30 weight percent aqueous hydrogen peroxide. The wafer was then rinsed with deionized water and then with isopropanol, after which it was dried under a stream of air. The wafer was then spin-coated with OMNICOAT adhesion promoter (obtained from MicroChem Corp., Newton, Mass.) according to directions provided by the manufacturer. Rhodamine B hexafluoroantimonate and SR1012 were each dissolved in the minimum volume of cyclopentanone, and an aliquot of each solution was combined with SU 8 R2150 to give a mixture that was 0.5 weight percent Rhodamine B hexafluoroantimonate and 1.0 weight percent SR1012, based on the total weight of solids. Sufficient cyclopentanone was added to the mixture to adjust the solids concentration to approximately 67 weight percent. This solution was filtered through a 1-micron syringe filter and was spin-coated onto the silicon wafer, which was then heated in a forced air oven overnight at 60° C. and then for ten minutes at 95° C. The wafer was then allowed to cool to room temperature. The dry coating thickness was approximately 30 micrometers.

Two-photon photopolymerization of the dry coating was carried out essentially as described in Example 1, except that the resulting array was to contain 12 aspherical microlenses having Equation 1 parameters of r=13.5 micrometers, a=0.77, b=1, and c=0.66. After the photopolymerization step, the resulting irradiated sample was heated on a series of hot plates at 75° C. for one minute, then at 95° C. for five minutes, then at 75° C. for one minute. After the sample was allowed to cool to room temperature, the sample was developed in PGMEA. The resulting microlens array was analyzed by optical microscopy and electron microscopy. Each lens was found to have a sag of approximately 25 micrometers and to tilt away from the center of the array.

Example 3

Fabrication of an Array of Microlenses of Varying Curvature

A coated silicon wafer was prepared essentially as described in Example 2. Two-photon photopolymerization of the dry coating was carried out essentially as described in Example 1, except that the galvoscanner was programmed to irradiate in a pattern to provide an array of three microlenses, each having a different curvature (the array having a spatial variation in focal length; a first microlens having a surface described by Equation 1, where r=27 micrometers, a=0.77, b=1, and c=0.66; a second microlens having a surface described by Equation 1, where r=36 micrometers, a=0.77, b=1, and c=0.66; and a third microlens having a surface described by Equation 1, where r=45 micrometers, a=0.77, b=1, and c=0.66). After the photopolymerization step, the resulting irradiated sample was heated on a series of hot plates at 75° C. for one minute, then at 95° C. for five minutes, then at 75° C. for one minute. After the sample was allowed to cool to room temperature, the sample was developed in PGMEA. The resulting array of three aspherical microlenses was analyzed by optical microscopy and electron microscopy.

Example 4

Fabrication of a Hexagonal-Packed Microlens Array

A circular silicon wafer having a diameter of approximately 10.2 cm (approximately 4 inches) was cleaned and coated essentially as described in Example 1, except that the monomer mixture included 0.5 weight percent (based on total weight of solids) photosensitizer dye N, N, N-tris(7-(2-benzothiazolyl)-9,9-diethyl-2-fluorenyl)amine (instead of Rhodamine B hexafluoroantimonate; described along with its synthesis in Example 20 of U.S. Pat. No. 6,300,502 (Kannan et al.)) and CGI 7460 (0.5 weight percent, based on total weight of solids), and the coating thickness of the monomer mixture was approximately 20 micrometers. The uncoated side of the wafer was rinsed with 2-propanol, and the wafer was then mounted on a porous carbon vacuum chuck that was itself mounted on a three-point leveling base with the uncoated side of the wafer in contact with the chuck. The leveling base was leveled by adjusting the appropriate leveling screw or screws that were set at the three adjustment points near the perimeter of the base.

The two-photon photopolymerization system described in Example 1 (except with a microscope objective lens having a numeric aperture of 0.9) was then used with a confocal interface locator system (described below) to level the surface of the wafer (according to the procedure described below), so that it was within about 500 nanometers of the focal plane of the exposure system. The focus of the laser beam was thus maintained, with respect to the interface between the surface of the silicon wafer and the polymerizable coating, so that substantially no coating was left unpolymerized between a microlens in the array and the surface of the silicon wafer The confocal interface locator system was an optical train having a beam splitter (Model 10RQ00UB.2 available from Newport Irvine, Calif.), a mirror, a 10-micrometer pinhole, a photomultiplier tube (a Model R3898 photomultiplier tube, available from Hamamatsu Corp., Bridgewater, N.J., in a Model PR1405.C6 housing, available from Products for Research, Inc., Danvers, Mass.) that was powered by a Model PS 300 DC power supply (available from Stanford Research Systems Inc., Sunnyvale, Calif.), an amplifier (Model 3312, available from Pomona Electronics, Everett, Wash.), and a multimeter (Fluke Model 73III). The two-photon photopolymerization system was activated, and the laser signal was used to detect the interface between the surface of the silicon wafer and the polymerizable coating before being used to fabricate the microlens array, as described below.

The three-point leveling base was moved so that the focused laser beam was directed at a point outside of the planned microlens array area. The focused laser signal that reflected from the surface of the silicon wafer (that is, at the interface of the coating) passed back through the galvoscanner and then through the beam splitter and was reflected by the mirror through the bandpass filter. The bandpass filter passed only the focused laser signal and not light of other wavelengths (such as the fluorescence emission from the photosensitizer in the coating on the wafer). After passing through the 10-micrometer pinhole, the focused laser signal was amplified by the photomultiplier tube, and the electrical signal from the tube was monitored as a potential (voltage) using the multimeter. The highest intensity reflected laser signal was the focused laser signal, noted as a maximum voltage on the multimeter. Voltages lower than the maximum voltage indicated that that focus of the laser was not reflected by the surface of the silicon wafer, that is, the focus of the laser was either substantially above or substantially below the interface between the coating and the wafer.

After the surface of the wafer was detected in this manner, the leveling base holding the wafer was moved under the laser, and adjustments were then made to the three-point leveling base until the focused laser beam was again reflected from the surface of the wafer, again at a point outside of the planned microlens array area, as indicated by a maximum voltage as measured using the multimeter. This process was repeated two more times to provide the surface of the silicon wafer within 500 nanometers of the optical plane of the exposure system.

Two-photon polymerization of the dry coating was then carried out, so as to produce a hexagonal-packed array of 1760 by 2490 aspherical, radially symmetric microlenses that was approximately 4.4 cm by 4.4 cm in size (slice thickness of 660 nm; fill factor of 71.1 percent; average surface roughness of 38 nm; sag of 8.3 microns).

The hexagonal-packed array of 1760 by 2490 microlenses was used as a masterform in a process to replicate the array. A two-part silicone resin (RTV 615A/B, available from GE Silicones, Waterford, N.Y.) was used to make a silicone mold of the microlens array. Ten parts by weight of RTV 615A were stirred with one part by weight of RTV 615B for approximately 30 minutes. An aluminum ring having a height of approximately 14.3 millimeters (0.56 inch) and a diameter larger than the largest dimension of the microlens array was placed over the array. The silicone mixture was then poured over the array and was contained by the aluminum ring. The resulting sample was then placed in a vacuum chamber and was held at a pressure of approximately 4000 Pa (30 mmHg) for approximately one hour. The sample was then placed in a forced air oven at a temperature of 55° C. for approximately 100 minutes. The sample was then allowed to cool to room temperature, and the resulting cured silicone resin was removed from the microlens array masterform to afford a silicone mold of the microlens array.

A mixture of IRGACURE 819 (0.3 g) and SARTOMER 238 (5.0 g) was filtered through a 0.2-micrometer syringe filter and was combined with PHOTOMER 6210 (15.0 g), which had been heated to approximately 55° C. for approximately 30 minutes. The resulting curable mixture was poured into the silicone mold, and the filled silicone mold was then placed in a vacuum chamber and was held at a pressure of approximately 4000 Pa (30 mmHg) for approximately 45 minutes. The filled silicone mold was then placed on a glass plate such that the curable mixture was in contact with the glass plate. Light hand pressure was briefly applied to the top of the silicone mold. The curable mixture was irradiated using a H-type bulb in a Model DRS-120 ultraviolet processor (available from Fusion UV Systems, Inc., Gaithersburg, Md.). The filled silicone mold was passed through the processor (with the silicone mold facing the ultraviolet bulb) seven times at a processor (belt) speed of 4.5 m (15 feet) per minute. The filled silicone mold was then allowed to cool to room temperature, after which time the silicone mold was removed from the resulting cured mixture to afford a replica of the microlens array.

Example 5

Fabrication of a Tilted Microlens Array

Figure 2B:
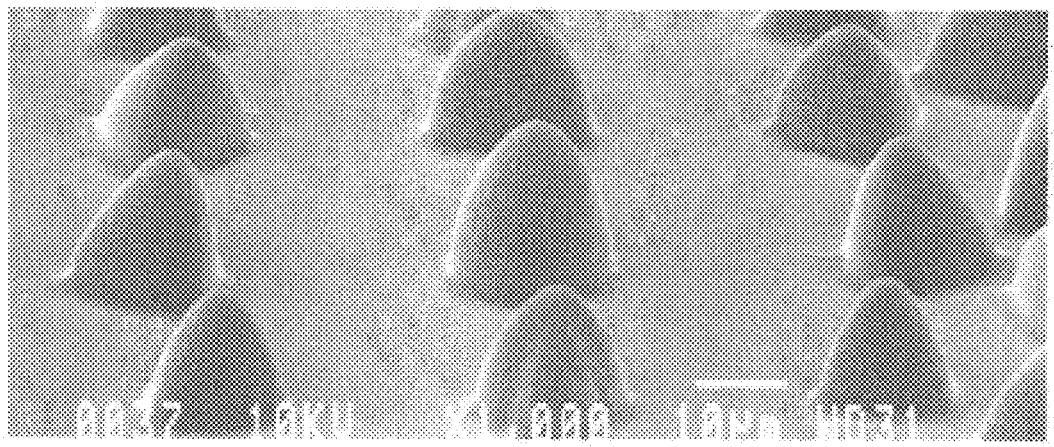

A circular (10.2 cm (4 inches)) diameter silicon wafer was cleaned and coated essentially as described in Example 1, except that the dry coating thickness was approximately 300 micrometers. The uncoated side of the wafer was rinsed with 2-propanol, and the wafer was then mounted on a porous carbon vacuum chuck that was itself mounted on a three-point leveling base with the uncoated side of the wafer in contact with the chuck. The two-photon photopolymerization system described in Example 4 was then used with the confocal interface locator system described in Example 4 to prepare a three by three array of tilted microlenses (slice thickness of 560 nm). FIGS. 2a and 2b show scanning electron micrographs of a top view and a side view, respectively, of the array.

Example 6

Fabrication of a Hexagonal-Packed Microlens Array

A coated silicon wafer was prepared essentially as described in Example 5, except that the coating thickness of the monomer mixture was approximately 10 micrometers. The coated wafer was then mounted on a porous carbon vacuum chuck that was itself mounted on a three-point leveling base with the uncoated side of the wafer in contact with the chuck. The two-photon photopolymerization system described in Example 4 was then used with the above-described confocal interface locator system to level the surface of the wafer, so that it was within about 500 nanometers of the optical plane of the exposure system, essentially as described in Example 5.

Two-photon polymerization of the dry coating was carried out using essentially the system and procedure described in Example 4 (slice thickness of 660 nm), except that the interface between the wafer and the dry coating was not determined by monitoring the two-photon fluorescence as a function of z-axis location. The resulting hexagonal-packed array of 2273 by 3214 aspherical, radially symmetric microlenses was approximately 5.0 cm by 5.0 cm in size (fill factor of 91.8 percent; sag of 8.3 microns).

The referenced descriptions contained in the patents, patent documents, and publications cited herein are incorporated by reference in their entirety as if each were individually incorporated. Various unforeseeable modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A process comprising
   (a) providing a photoreactive composition, said photoreactive composition comprising:
      (1) at least one curable species that is capable of undergoing an acid- or radical-initiated chemical reaction, and
      (2) at least one multiphoton photoinitiator system comprising photochemically effective amounts of
         (i) a multiphoton photosensitizer having a two-photon absorption cross-section greater than that of fluorescein;
         (ii) optionally, at least one electron donor selected from alkylarylborate salts, tertiary aromatic alkylamines, and mixtures thereof; and
         (iii) at least one photoinitiator selected from iodonium salts, sulfonium salts, and mixtures thereof;
   (b) imagewise exposing at least a portion of said composition to light sufficient to cause simultaneous absorption of at least two photons, thereby inducing at least one acid- or radical-initiated chemical reaction where said composition is exposed to the light, said imagewise exposing being carried out in a pattern that is effective to define at least the surface of a plurality of microlenses comprising at least one aspherical microlens, each said microlens having a principal axis and a focal length, and at least one of said principal axis and said focal length of at least one said microlens being different from that of at least one other said microlens; and
   (c) developing said composition by removing at least a portion of the resulting non-exposed portion of said composition.

2. The process of claim 1, wherein, after imagewise exposing at least a portion of said composition and developing said composition, said process further comprises nonimagewise exposing at least a portion of said composition to light sufficient to effect reaction of at least a portion of any remaining non-exposed portion of said photoreactive composition.

3. The process of claim 1, wherein said process further comprises providing said photoreactive composition on a substrate and locating the interface between said composition and said substrate; and wherein said imagewise exposing is carried out by scanning at least the perimeter of a plurality of planar slices of a desired three-dimensional microlens structure, while varying slice thickness so as to achieve a microlens surface roughness of less than the slice thickness.

4. A plurality of microlenses, at least one of said microlenses being aspherical, and each of said microlenses having a principal axis, said principal axis of at least one said microlens being different from that of at least one other said microlens; wherein at least a majority of said microlenses have an f number of less than 10.

5. The plurality of microlenses of claim 4, wherein at least a majority of said microlenses are aspherical.

6. The plurality of microlenses of claim 4, wherein at least a majority of said microlenses have a diameter of less than 1 millimeter.

7. The plurality of microlenses of claim 4, wherein at least a majority of said microlenses have an average surface roughness of less than half an operating wavelength.

8. The plurality of microlenses of claim 4, wherein said plurality of microlenses has a fill factor in the range of 50 to 100 percent.

9. The plurality of microlenses of claim 4, wherein said plurality of microlenses exhibits an asymmetrical variation in said principal axes.

10. The plurality of microlenses of claim 4, wherein said plurality of microlenses exhibits a symmetrical variation in said principal axes.

11. The plurality of microlenses of claim 4, wherein at least one of said microlenses is anamorphic.

* * * * *

UNITED STATES PATENT AND TRADEMARK OFFICE
CERTIFICATE OF CORRECTION

PATENT NO. : 8,004,767 B2
APPLICATION NO. : 12/509904
DATED : August 23, 2011
INVENTOR(S) : Robert J Devoe It is certified that error appears in the above-identified patent and that said Letters Patent is hereby corrected as shown below:

Title Page
Item [56], References Cited, OTHER PUBLICATIONS, page 2, column 2, delete "Actutators" and insert -- Actuators --, therefor.

Column 4
Line 11, delete "$10^{14}$" and insert -- $10^{-14}$ --, therefor.

Column 5
Line 67, delete "cylcohexene" and insert -- cyclohexene --, therefor.

Column 6
Line 5, delete "6-methylcylcohexylmethyl" and insert -- 6-methylcyclohexylmethyl --, therefor.
Line 5, delete "6-methylcylcohexane" and insert -- 6-methyl-cyclohexane --, therefor.
Line 11 (Approx.), delete "methylclyclohexylmethyl)adipate;" and insert
-- methylcyclohexylmethyl)adipate; --, therefor.
Line 17-18, delete "epoxycylclohexylethyltrimethoxysilane" and insert
-- epoxycyclohexylethyltrimethoxysilane --, therefor.
Line 30, delete "novolak" and insert -- novolac --, therefor.
Line 40, delete "MODFIER" and insert -- MODIFIER --, therefor.
Line 40, delete "alky" and insert -- alkyl --, therefor.
Line 42-43, delete "MODIFER" and insert -- MODIFIER --, therefor.
Line 43, delete "MODIFER" and insert -- MODIFIER --, therefor.
Line 44, delete "MODIFER" and insert -- MODIFIER --, therefor.
Line 46, delete "MODIFER" and insert -- MODIFIER --, therefor.
Line 48, delete "MODIFER" and insert -- MODIFIER --, therefor.
Line 50, delete "MODIFER" and insert -- MODIFIER --, therefor.
Line 51, delete "MODIFER" and insert -- MODIFIER --, therefor.

Signed and Sealed this
Twenty-ninth Day of November, 2011

David J. Kappos
*Director of the United States Patent and Trademark Office*

Column 8
Line 39, delete "moeties" and insert -- moieties --, therefor.

Column 15
Line 57, delete "(CF3 SO2)2N⁻," and insert -- (CF3SO2)2N⁻, --, therefor.
Line 58, delete "C31 ," and insert -- C⁻, --, therefor.
Line 59, delete "(CF3)2NC2F4SO2C-(SO2 CF3)2," and insert
-- (CF3)2NC2F4SO2C-(SO2CF3)2, --, therefor.

Column 16
Line 31, delete "tritolysulfonium" and insert -- tritolylsulfonium --, therefor.
Line 56, after "hexafluorophosphate" insert -- . --.
Line 62, delete "K185" and insert -- KI85 --, therefor.

Column 26
Line 55, after "wafer" insert -- . --.